US008810203B2

(12) United States Patent
Abe et al.

(10) Patent No.: US 8,810,203 B2
(45) Date of Patent: Aug. 19, 2014

(54) BATTERY CONTROL DEVICE AND BATTERY CONTROL METHOD

(75) Inventors: Hiroyuki Abe, Anjo (JP); Tetsuya Hatta, Kuwana (JP)

(73) Assignee: NGK Insulators, Ltd., Nagoya (JP)

( * ) Notice: Subject to any disclaimer, the term of this patent is extended or adjusted under 35 U.S.C. 154(b) by 343 days.

(21) Appl. No.: 13/295,496

(22) Filed: Nov. 14, 2011

(65) Prior Publication Data

US 2012/0056591 A1   Mar. 8, 2012

Related U.S. Application Data

(63) Continuation of application No. PCT/JP2010/059914, filed on Jun. 11, 2010.

(30) Foreign Application Priority Data

Jun. 24, 2009   (JP) .................................. 2009-149810

(51) Int. Cl.
    *H02J 7/00*   (2006.01)
(52) U.S. Cl.
    USPC .......................................................... 320/132
(58) Field of Classification Search
    USPC .......................................................... 320/132
    See application file for complete search history.

(56) References Cited

U.S. PATENT DOCUMENTS

| 6,114,836 A | 9/2000 | Hagiwara et al. | |
| 6,661,231 B1 * | 12/2003 | Arai et al. | 320/132 |
| 2004/0257087 A1 | 12/2004 | Murakami | |
| 2006/0232277 A1 * | 10/2006 | Murakami et al. | 324/433 |
| 2008/0076010 A1 | 3/2008 | Sato | |
| 2008/0125932 A1 * | 5/2008 | Yamabe et al. | 701/29 |
| 2008/0157777 A1 * | 7/2008 | Yamabe | 324/426 |

FOREIGN PATENT DOCUMENTS

| JP | 10-268985 A1 | 10/1998 |
| JP | 2003-197275 A1 | 7/2003 |
| JP | 2008-084677 A1 | 4/2008 |

* cited by examiner

*Primary Examiner* — Edward Tso
*Assistant Examiner* — Robert Grant
(74) *Attorney, Agent, or Firm* — Burr & Brown, PLLC

(57) ABSTRACT

A power storage device has a NaS battery for storing electric power, a Hall current detector for measuring charge/discharge current value I of the NaS battery, a bidirectional converter for converting electric power between a direct current and an alternating current bidirectionally, and a controller for controlling the power storage device. The controller integrates the charge/discharge current value I of the NaS battery and calculates the calculated value of the discharge capacity in the NaS battery. The controller calculates estimated error Er(t2) of the calculated value of the discharge capacity, specifies NaS battery 1004 that requires the correction of the calculated value of the discharge capacity, charges/discharges the NaS battery to a depth of discharge at which the calculated value of the discharge capacity is corrected, and corrects the calculated value of the discharge capacity in the charged/discharged NaS battery.

18 Claims, 15 Drawing Sheets

F I G . 1
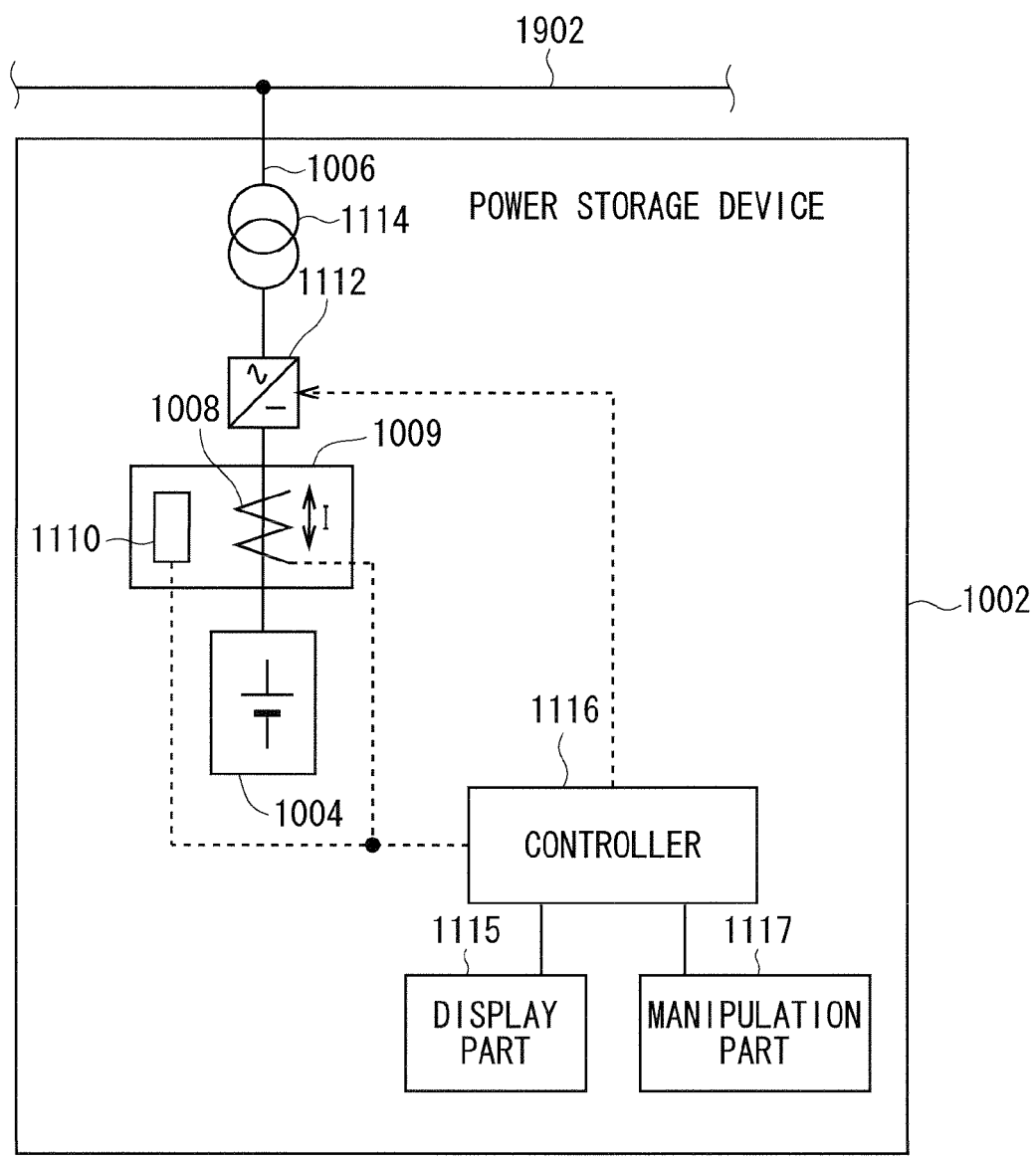

F I G. 5
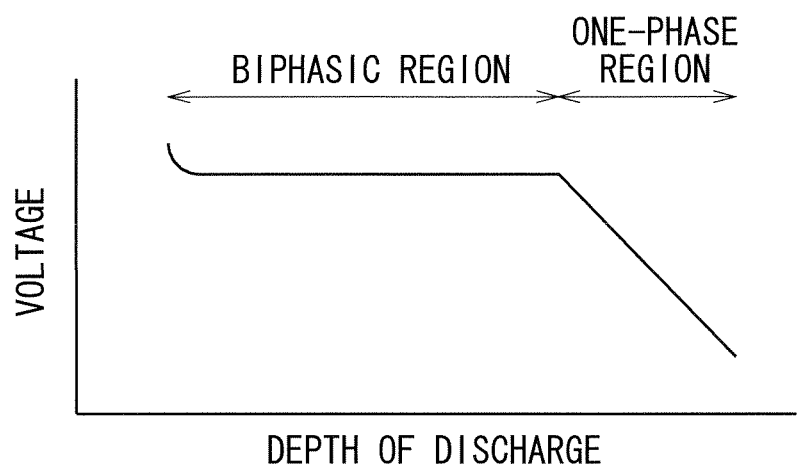

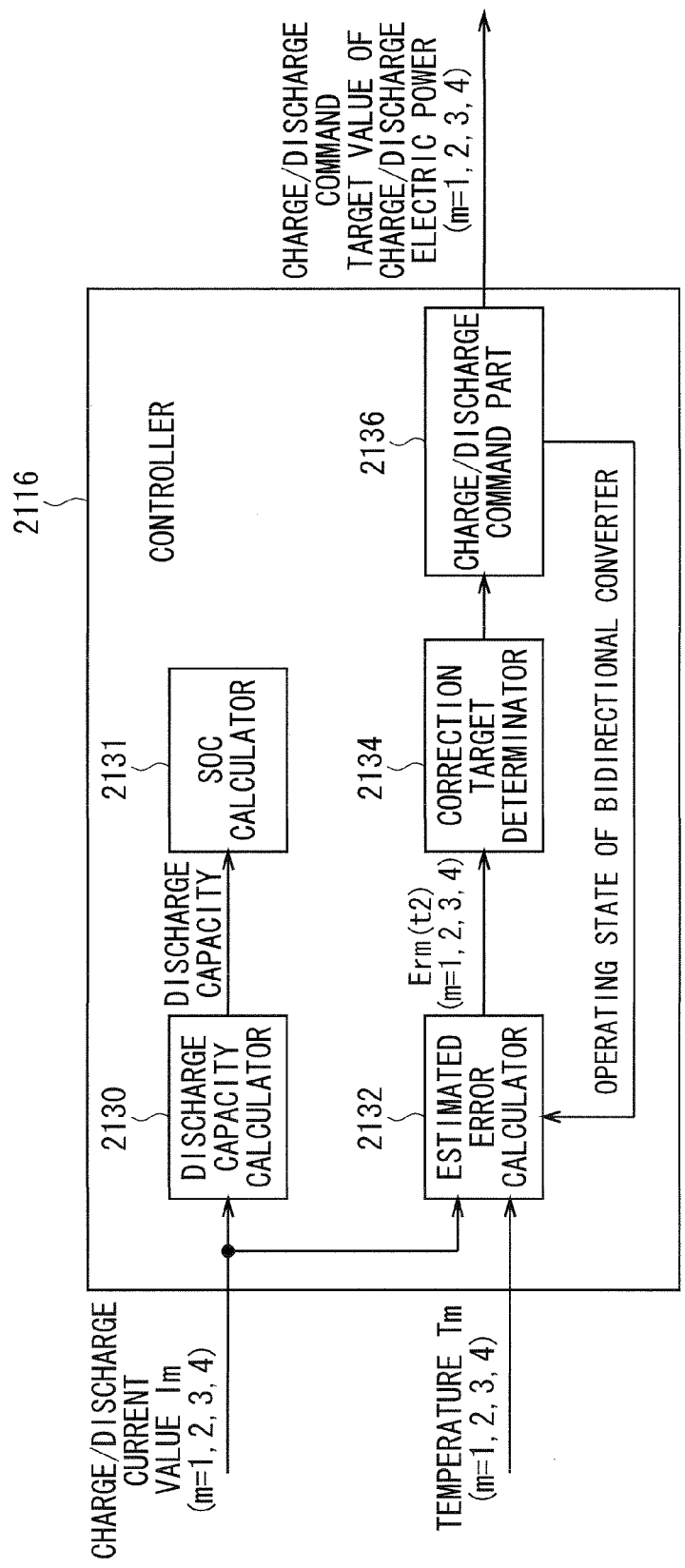
F I G . 7

F I G. 1 4
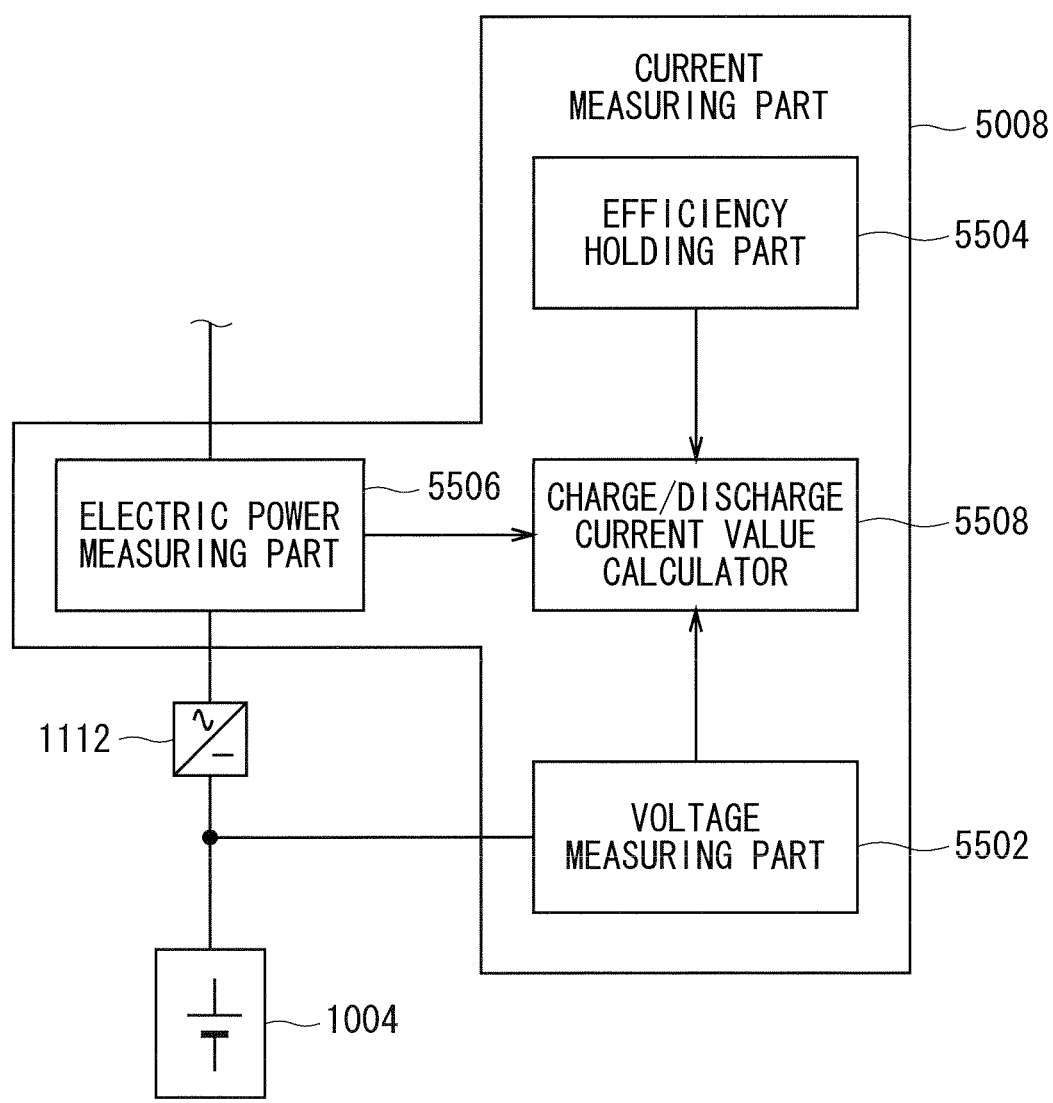

BATTERY CONTROL DEVICE AND BATTERY CONTROL METHOD

BACKGROUND OF THE INVENTION

1. Field of the Invention

The present invention relates to a battery control device and a battery control method for controlling a secondary battery.

2. Description of the Related Art

Patent Document 1 relates to control of charge/discharge of a plurality of NaS batteries.

Patent Document 1 describes that when a power storage device having a plurality of NaS batteries provided to an electrical supply network is caused to follow a power source such as natural energy whose output changes irregularly for a short time, an error of a calculated value of a discharge capacity is easily generated, and thus the calculated value of the discharge capacity should be corrected.

Further, Patent Document 1 describes that the calculated values of the discharge capacities in the NaS batteries are corrected sequentially one by one.

PRIOR ART DOCUMENT

Patent Document

Patent Document 1: Japanese Patent Application Laid-Open No. 2008-84677

SUMMARY OF THE INVENTION

However, the correction of the calculated value of the discharge capacity in Patent Document 1 occasionally causes problems that the correction of the calculated value of the discharge capacity in a NaS battery that requires the correction of the calculated value of the discharge capacity is delayed, and that the correction of the calculated value of the discharge capacity is corrected at time intervals that are shorter than necessary and thus unnecessary correction of the calculated value of the discharge capacity is made. Such improper correction is not desirable because an output from a power storage device is greatly influenced.

The present invention is devised in order to solve such problems, and an object thereof is to provide a battery control device and a battery control method with which a calculated value of a discharge capacity in a secondary battery requiring correction of the calculated value of the discharge capacity is corrected, and unnecessary correction of the calculated value of the discharge capacity is not made.

Means for Solving the Problems

Means for solving the above problems will be described below.

A first invention is a battery control device for controlling a secondary battery, including a current measuring part for measuring a charge/discharge current value of the secondary battery, a discharge capacity calculator for integrating the charge/discharge current value measured by the current measuring part so as to calculate calculated value of a discharge capacity in the secondary battery and correcting the calculated value of the discharge capacity in the secondary battery charged/discharged to a depth of discharge at which the calculated value of the discharge capacity is corrected, an estimated error calculator for calculating an estimated error of the calculated value of the discharge capacity calculated by the discharge capacity calculator, a first comparator for setting the secondary battery where the estimated error calculated by the estimated error calculator exceeds a first threshold as a candidate for correction of the calculated value of the discharge capacity, a first threshold holding part for holding the first threshold, a bidirectional converter for controlling charge/discharge of the secondary battery, and a charge/discharge command part for causing the bidirectional converter to charge/discharge all or some of the secondary battery as the candidate for the correction of the calculated value of the discharge capacity to the depth of discharge at which the correction is made.

A second invention is the battery control device according to the first invention, wherein the estimated error calculator calculates the estimated error including a factor expressed by integration from a time of a previous correction of the calculated value of the discharge capacity to a current time.

A third invention is the battery control device according to the first or second invention, wherein the estimated error calculator calculates the estimated error including the factor that becomes larger as a correcting amount in a previous correction of the calculated value of the discharge capacity is larger.

A fourth invention is the battery control device according to any of the first to third inventions, wherein the estimated error calculator calculates the estimated error including a factor that becomes larger as a change over time in the charge/discharge current value measured by the current measuring part is larger.

A fifth invention is the battery control device according to any of the first to fourth inventions, wherein the estimated error calculator calculates the estimated error including a factor that becomes larger as the charge/discharge current value measured by the current measuring part is larger.

A sixth invention is the battery control device according to any of the first to fifth inventions, wherein the discharge capacity calculator stops an integration of the charge/discharge current value while the charge/discharge current value measured by the current measuring part is smaller than a reference value, and the estimated error calculator calculates the estimated error including a factor that becomes larger as the charge/discharge current value is larger when the charge/discharge current value measured by the current measuring part is smaller than the reference value.

A seventh invention is the battery control device according to any of the first to sixth inventions, wherein the estimated error calculator calculates the estimated error including a factor that becomes larger as an offset included in the charge/discharge current value measured by the current measuring part with respect to true charge/discharge current value is larger.

An eighth invention is the battery control device according to any of the first to seventh inventions, further including a housing for housing the current measuring part, and a temperature sensor for measuring a temperature in the housing, wherein the estimated error calculator calculates the estimated error including a factor that becomes larger as the temperature measured by the temperature sensor is deviated from a reference temperature.

A ninth invention is the battery control device according to any of the first to eighth inventions, wherein the estimated error calculator calculates the estimated error including a factor that reflects an operating state of the bidirectional converter.

A tenth invention is the battery control device according to any of the first to ninth inventions, further including a first selector for selecting the secondary battery to the allowed number in descending order of the estimated error calculated by the estimated error calculator as the target for the correction of the calculated value of the discharge capacity from the secondary battery that is set as the candidate for the correction of the calculated value of the discharge capacity by the first comparator, wherein the charge/discharge command part causes the bidirectional converter to charge/discharge the secondary battery selected by the first selector to the depth of discharge at which the correction is made.

An eleventh invention is the battery control device according to any of the first to tenth inventions, further including a second comparator for comparing the estimated error calculated by the estimated error calculator with a second threshold that does not exceed the first threshold and setting the secondary battery where the estimated error calculated by the estimated error calculator exceeds the second threshold as the candidate for the correction of the calculated value of the discharge capacity, and a second threshold holding part for holding the second threshold, wherein the charge/discharge command part causes the bidirectional converter to charge/discharge all or some of the secondary battery set as the candidate for the correction of the calculated value of the discharge capacity by the second comparator to the depth of discharge at which the correction is made.

A twelfth invention is the battery control device according to the eleventh invention, further including a second selector for, when the number of the secondary battery set as the candidate for the correction of the calculated value of the discharge capacity by the second comparator is two or more, selecting the secondary battery to the allowed number in descending order of the estimated error calculated by the estimated error calculator as the target for the correction of the calculated value of the discharge capacity from the secondary battery set as the candidate for the correction of the calculated value of the discharge capacity by the second comparator, and when the number of the secondary battery set as the candidate for the correction of the calculated value of the discharge capacity by the second comparator is 1 or less, unselecting the target for the correction of the calculated value of the discharge capacity, wherein the charge/discharge command part causes the bidirectional converter to charge/discharge the secondary battery selected by the second selector to the depth of discharge at which the correction is made.

A thirteenth invention is the battery control device according to any of the first to twelfth inventions, further including a chargeable/dischargeable number determinator for determining the number of the secondary battery capable of being charged/discharged simultaneously for the correction of the calculated value of the discharge capacity in a time zone to which a current time belongs, and a chargeable/dischargeable number holding part for holding the number of the secondary battery capable of being charged/discharged simultaneously for the correction of the calculated value of the discharge capacity in each time zone, wherein the charge/discharge command part causes the bidirectional converter to charge/discharge secondary battery whose number does not exceed the number of the secondary battery determined by the chargeable/dischargeable number determinator to the depth of discharge at which the correction is made.

A fourteenth invention is the battery control device according to any of the first to thirteenth inventions, wherein the current measuring part includes a Hall current detector.

A fifteenth invention is the battery control device according to any of the first to thirteenth inventions, wherein the charge/discharge command part sets a target value of a charge/discharge electric power, the bidirectional converter controls the charge/discharge of the secondary battery so that the charge/discharge electric power becomes the target value, and the current measuring part includes a voltage measuring part for measuring voltage of the secondary battery, a charge/discharge current value calculator for calculating the charge/discharge current value based on the target value of the charge/discharge electric power set by the charge/discharge command part, the voltage measured by the voltage measuring part and efficiency of the bidirectional converter, and an efficiency holding part for holding the efficiency of the bidirectional converter.

A sixteenth invention is the battery control device according to any of the first to thirteenth inventions, wherein the current measuring part includes a voltage measuring part for measuring voltage of the secondary battery, an electric power measuring part for measuring input/output electric power on an alternating current side of the bidirectional converter, a charge/discharge current value calculator for calculating the charge/discharge current value based on the voltage measured by the voltage measuring part, the input/output electric power measured by the electric power measuring part and efficiency of the bidirectional converter, and an efficiency holding part for holding the efficiency of the bidirectional converter.

A seventeenth invention is the battery control device according to any of the first to ninth inventions, further including a display part for displaying the estimated error calculated by the estimated error calculator and a compared result of the first comparator, and a manipulation part for accepting an input of a command for charging/discharging the secondary battery to the depth of discharge at which the calculated value of the discharge capacity is corrected, wherein the charge/discharge command part causes the bidirectional converter to charge/discharge the secondary battery being the target for the correction of the calculated value of the discharge capacity which the manipulation part accepts the input of a command for charging/discharging to the depth of discharge where the correction is made.

An eighteenth invention is a battery control method for controlling a secondary battery, including a) a step of measuring charge/discharge current value of the secondary battery, b) a step of integrating the charge/discharge current value measured by the step a) and calculating calculated value of a discharge capacity in the secondary battery, c) a step of calculating estimated error of the calculated value of the discharge capacity calculated by the step b), d) a step of setting the secondary battery where the estimated error calculated by the step c) exceeds a threshold as a candidate for correction of the calculated value of the discharge capacity, e) a step of charging/discharging all or some of the secondary battery as the candidate for the correction of the discharge capacity to a depth of discharge at which the correction is made, and f) a step of correcting the calculated value of the discharge capacity in the secondary battery charged/discharged to the depth of discharge at which the calculated value of the discharge capacity is corrected.

Effects of the Invention

According to the present invention, since the secondary battery where the estimated error exceeds the first threshold is the candidate for the correction of the calculated value of the discharge capacity, the calculated value of the discharge capacity in the secondary battery requiring the correction of the calculated value of the discharge capacity is corrected, and the calculated value of the discharge capacity that does not require the correction is not corrected.

According to the second invention, the secondary battery where an error is accumulated in the calculated value of the discharge capacity quickly becomes the target for the correction of the calculated value of the discharge capacity, and thus the calculated value of the discharge capacity is corrected on a timely basis.

According to the third invention, since the secondary battery where an error of the calculated value of the discharge capacity becomes easily large quickly becomes the target for the correction of the calculated value of the discharge capacity, the calculated value of the discharge capacity is corrected on a timely basis.

According to the fourth invention, the secondary battery where an error caused by a response speed of the current measuring part, a frequency characteristic of the current measuring part, a measurement interval of the charge/discharge current value and so on greatly influence the calculated value of the discharge capacity quickly becomes the target for the correction of the calculated value of the discharge capacity. For this reason, the calculated value of the discharge capacity is corrected on a timely basis.

According to the fifth invention, the secondary battery, where an error caused by a non-linear property of the current measuring part, an error that is included in the measured value of the current measuring part and is proportional to the measured value of the current measuring part and so on greatly influence the calculated value of the discharge capacity, quickly becomes the target for the correction of the calculated value of the discharge capacity. For this reason, the calculated value of the discharge capacity is corrected on a timely basis.

According to the sixth invention, the secondary battery, where an error caused by stopping the integration of the charge/discharge current value in the discharge capacity calculator greatly influences the calculated value of the discharge capacity, quickly becomes the target for the correction of the calculated value of the discharge capacity. For this reason, the calculated value of the discharge capacity is corrected on a timely basis.

According to the seventh invention, the secondary battery, where an error caused by the offset included in the charge/discharge current value measured by the current measuring part with respect to the true charge/discharge current value greatly influences the calculated value of the discharge capacity, quickly becomes the target for the correction of the calculated value of the discharge capacity. For this reason, the calculated value of the discharge capacity is corrected on a timely basis.

According to the eighth invention, the secondary battery, where an error caused by a temperature characteristic of the current measuring part greatly influences the calculated value of the discharge capacity, quickly becomes the target for the correction of the calculated value of the discharge capacity. For this reason, the calculated value of the discharge capacity is corrected on a timely basis.

According to the ninth invention, the secondary battery, where an error caused by the operating state of the bidirectional converter greatly influences the calculated value of the discharge capacity, quickly becomes the target for the correction of the calculated value of the discharge capacity. For this reason, the calculated value of the discharge capacity is corrected on a timely basis.

According to the tenth invention, since the calculated value of the discharge capacity in the secondary battery requiring the correction of the calculated value of the discharge capacity is automatically corrected, the charge/discharge of the secondary battery is automatically controlled.

According to the eleventh invention, the correction of the calculated values of the discharge capacities in the secondary batteries whose number is larger than the allowable number is hardly started simultaneously, an influence on all the output of the plurality of secondary batteries is suppressed.

According to the twelfth invention, the correction of the calculated values of the discharge capacities is made starting from the secondary battery where the estimated error is large and the correction of the calculated value of the discharge capacity is greatly needed, and the correction of the calculated values of the discharge capacities in a large number of secondary batteries are hardly started simultaneously. For this reason, an influence on all the outputs of the plurality of secondary batteries is suppressed.

According to the thirteenth invention, since the correction of the calculated values of the discharge capacities in the secondary batteries whose number is larger than the allowable number is not simultaneously started, an influence on all the outputs of the plurality of secondary batteries is suppressed.

According to the thirteenth invention, since the number of the secondary batteries where the calculated values of the discharge capacities are corrected does not exceed the number determined in each time zone, an influence on all the outputs of the plurality of secondary batteries is suppressed.

According to the fourteenth invention, since the charge/discharge current value is directly measured, the charge/discharge current value is measured with high accuracy.

According to the fifteenth invention, since the offset included in the measured charge/discharge current value with respect to the true charge/discharge current value reduces, measurement accuracy of the charge/discharge current values is improved.

According to the sixteenth invention, a small charge/discharge current can be measured.

BRIEF DESCRIPTION OF THE DRAWINGS

FIG. 1 is a block diagram illustrating a power storage device according to a first embodiment.

FIG. 5 is a graph illustrating a relationship between a depth of discharge and a voltage of the NaS battery.

FIG. 7 is a block diagram illustrating the controller according to the second embodiment.

FIG. 14 is a block diagram illustrating the current measuring part according to a fifth embodiment.

DETAILED DESCRIPTION OF THE INVENTION

An object, a characteristic, an aspect and an advantage of the present invention will become clear by the following detailed description and accompanying drawings.

(1. First Embodiment)

A first embodiment relates to a power storage device 1002.

(Outline of Power Storage Device 1002)

FIG. 1 is a block diagram illustrating the power storage device 1002 according to the first embodiment.

As shown in FIG. 1, the power storage device 1002 has a NaS battery (sodium-sulfur battery) 1004 for storing electric power, a connecting line 1006 for connecting a system 1902 and the NaS battery 1004, a Hall current detector 1008 for measuring a charge/discharge current value I of the NaS battery 1004, a housing 1009 for housing the Hall current detector 1008, a temperature sensor 1110 for measuring a temperature T inside the housing 1009, a bidirectional converter 1112 for converting electric power supplied from the NaS battery 1004 to the system 1902 from a direct current into an alternating current and converting electric power supplied from the system 1902 to the NaS battery 1004 from an alternating current into a direct current, a transformer 1114 for stepping up the electric power supplied from the NaS battery 1004 to the system 1902 and stepping down the electric power supplied from the system 1902 to the NaS battery 1004, a controller 1116 for controlling the power storage device 1002, a display part 1115 for displaying information, and a manipulation part 1117 for accepting a manipulation. Instead of the NaS battery, another kind of a secondary battery may be adopted.

The Hall current detector 1008, the bidirectional converter 1112 and the transformer 1114 are put into the connecting line 1006. The Hall current detector 1008 is connected to a direct current side of the bidirectional converter 1112, and the transformer 1114 is connected to an alternating current side of the bidirectional converter 1112.

The Hall current detector 1008, the temperature sensor 1110, the bidirectional converter 1112, the transformer 1114, the controller 1116, the display part 1115 and the manipulation part 1117 make up a NaS battery control device for controlling the NaS battery 1004. The controller 1116 integrates the charge/discharge current value I of the NaS battery 1004, and calculates a discharge capacity of the NaS battery 1004 so as to calculate SOC (State Of Charge) based on a calculated value of the discharge capacity. The controller 1116 specifies whether the NaS battery 1004 is a candidate for correction of the calculated value of the discharge capacity, charges/discharges the NaS battery 1004 specified as the candidate for the correction of the calculated value of the discharge capacity to a depth of discharge at which the calculated value of the discharge capacity is corrected, and corrects the calculated value of the discharge capacity in the charged/discharged NaS battery 1004.

(NaS Battery 1004)

Figure 2:
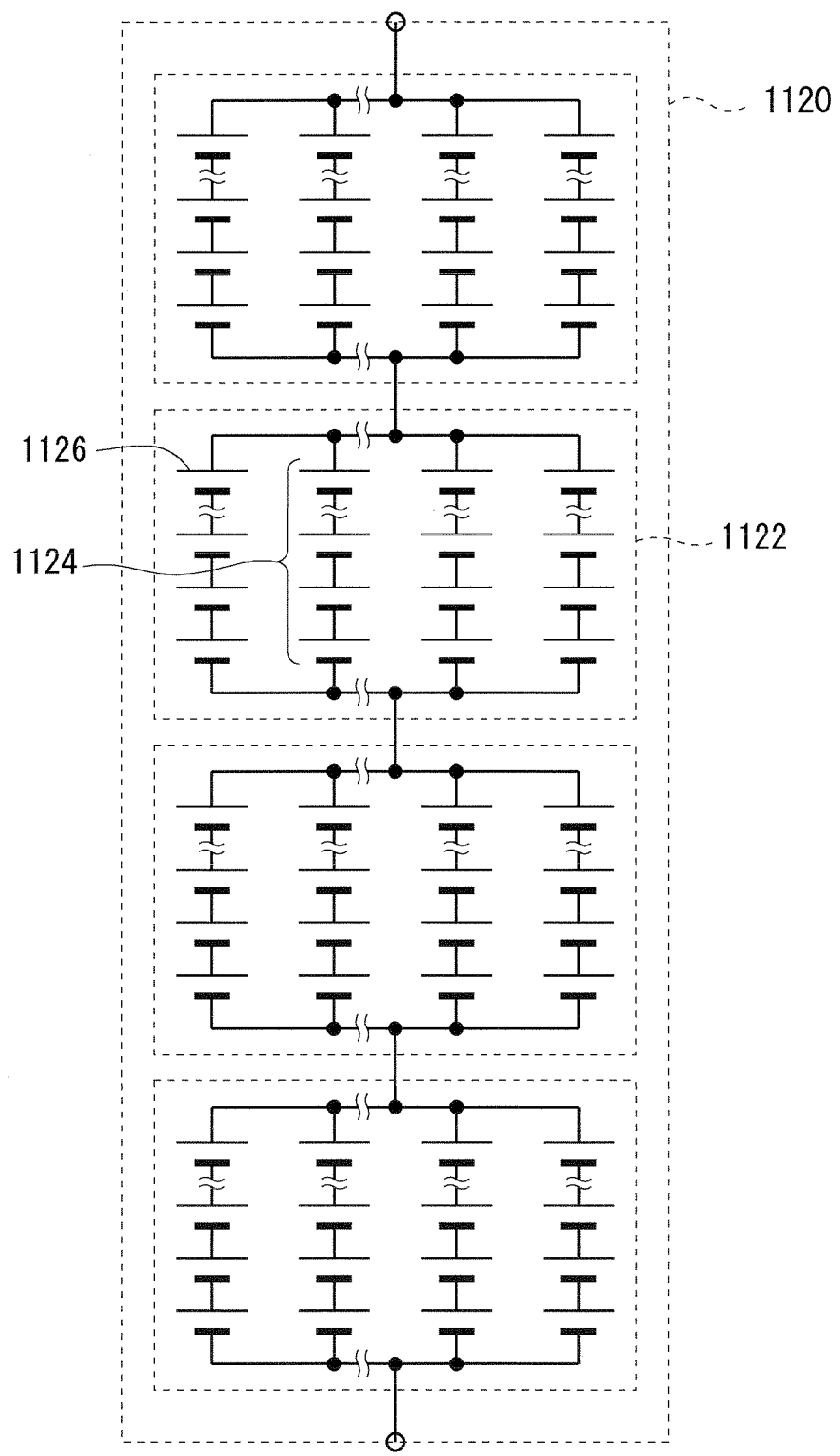
FIG. 2 is a circuit diagram illustrating a module of a NaS battery.

FIG. 2 is a circuit diagram illustrating a module 1120 of the NaS battery 1004.

As shown in FIG. 2, the module 1120 is a series connecting body in which blocks 1122 are connected in series, the blocks 1122 are parallel connecting bodies in which strings 1124 are connected in parallel, and the strings 1124 are series connecting bodies in which cells 1126 are connected in series. The number of the series-connected blocks 1122, the number of the parallel-connected strings 1124 and the number of the series-connected cells 1126 are increased or decreased according to specifications of the module 1120.

The NaS battery 1004 has one or more modules 1120. The number of the modules 1120 is increased or decreased according to specifications of the NaS battery 1004.

(Hall Current Detector 1008)

The Hall current detector 1008 measures the charge/discharge current value I of the NaS battery 1004.

The Hall current detector 1008 detects a magnetic field generated by a charge/discharge current via a Hall element, and an output of the Hall element is processed by an accessory circuit such as an A/D converter so as to be output. Instead of the Hall current detector 1008, a current sensor adopting another principle and a necessary accessory circuit may be adopted as a current measuring part.

When the Hall current detector 1008 is used as the current measuring part, the charge/discharge current value I is directly measured, and thus the charge/discharge current value I is measured with high accuracy.

The Hall current detector 1008 has a problem such that the charge/discharge current value I measured by the Hall current detector 1008 includes an offset with respect to a true charge/discharge current value (hereinafter, simply referred to as "an offset of the Hall current detector 1008"). Further, the Hall current detector 1008 has a problem such that the offset of the Hall current detector 1008 fluctuates due to the charge/discharge current value I and the temperature T inside the housing 1009. Further, the Hall current detector 1008 has a problem of nonlinearity such that the charge/discharge current value I measured by the Hall current detector 1008 is not accurately proportional to the true charge/discharge current value. In addition, the charge/discharge current value I measured by the Hall current detector 1008 has a problem such that an error that is proportional to the charge/discharge current value I is included. These problems cause an error of the calculated value of the discharge capacity calculated by integrating the charge/discharge current value I.

In the power storage device 1002 according to the first embodiment, an estimated error Er(t2) of the calculated value of the discharge capacity caused by these problems is calculated, and when the estimated error Er(t2) is large, the NaS battery 1004 is specified as a candidate for the correction of the calculated value of the discharge capacity.

Figure 3:
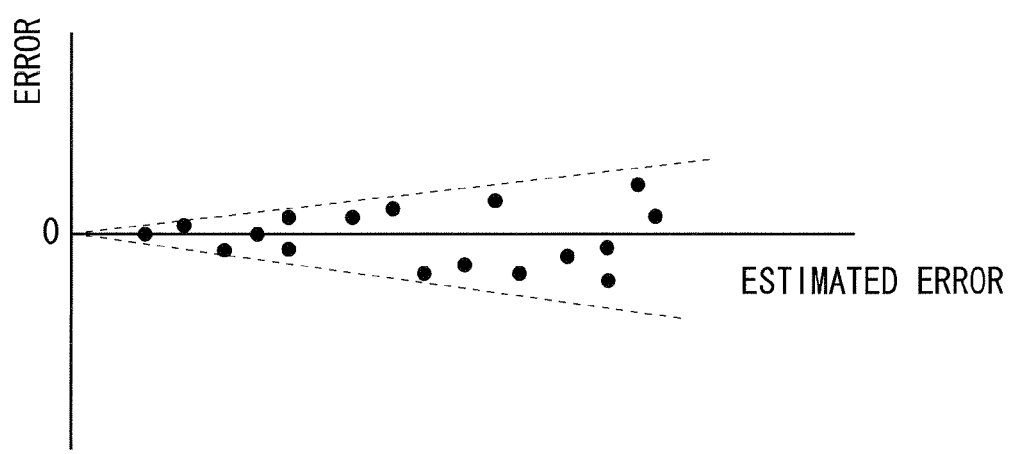
FIG. 3 is a diagram illustrating a relationship between an estimated error and an error.

FIG. 3 is a diagram illustrating a relationship between the estimated error Er(t2) and an error. The error shown in FIG. 3 is a value obtained by subtracting an actual discharge capacity from the calculated value of the discharge capacity. The estimated error Er(t2) is not directly an estimated value of a level of the error but is an estimated value in an error range. Therefore, as shown in FIG. 3, even when the estimated error has a large value, if a plurality of error factors cancel each other, the value of the error indicated by plot points of black circles becomes occasionally small.

(Bidirectional Converter 1112)

The bidirectional converter 1112 charges/discharges the NaS battery 1004 according to a charge/discharge command, and controls the charge/discharge of the NaS battery 1004 so that a charge/discharge electric power has a target value. The bidirectional converter 1112 controls the charge/discharge of the NaS battery 1004 so that a charge/discharge electric power command value transmitted from the controller 1116 matches with an actual charge/discharge electric power, and charges/discharges the NaS battery 1004 in order to eliminate an error of the calculated value of the discharge capacity.

The bidirectional converter 1112 is called also as "PCS (Power Conversion System)", "AC/DC converter" or the like. Mutual conversion between DC and AC in the bidirectional converter 1112 is performed by a PWM (Pulse Width Modulation) inverter or the like.

(Outline of Controller 1116)

Figure 4:
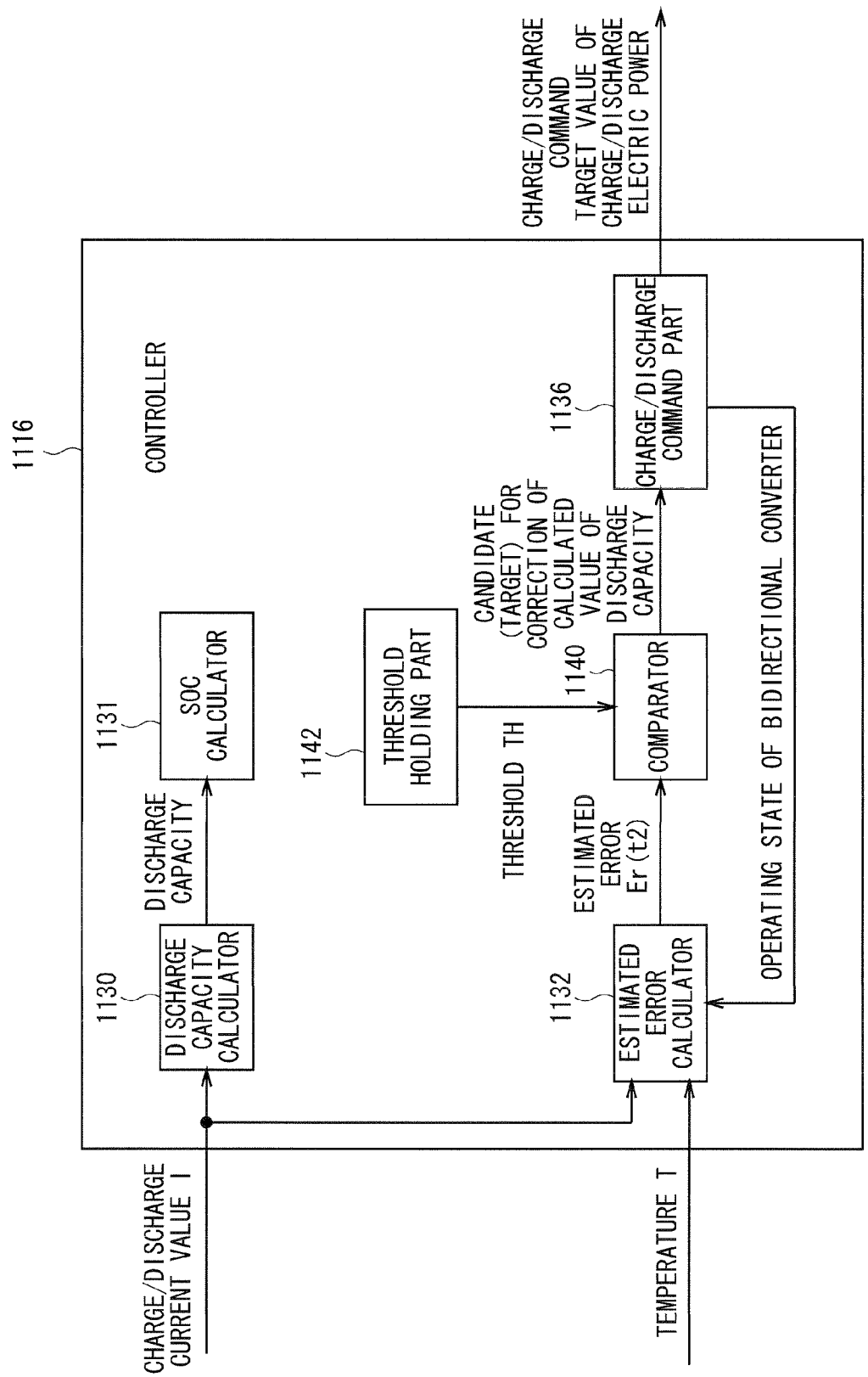
FIG. 4 is a block diagram illustrating a controller according to the first embodiment.

FIG. 4 is a block diagram illustrating the controller 1116. Respective blocks in FIG. 4 may be realized by at least allowing a built-in computer having a CPU and a memory to execute a control program, or by hardware. The controller 1116 transmits the input charge/discharge electric power command value to the bidirectional converter 1112. The charge/discharge electric power command value is input from the manipulation part 1117, or input from a microgrid control system of the microgrid including the power storage device 1002 via a communication line.

As shown in FIG. 4, the controller 1116 has a discharge capacity calculator 1130 for calculating the calculated value of the discharge capacity of the NaS battery 1004, an SOC calculator 1131 for calculating SOC of the NaS battery 1004, an estimated error calculator 1132 for calculating the estimated error Er(t2) of the calculated value of the discharge capacity calculated by the discharge capacity calculator 1130, a comparator 1140 for comparing the estimated error Er(t2) with a threshold TH, a threshold holding part 1142 for holding the threshold TH, and a charge/discharge command part 1136 for commanding the bidirectional converter 1112 to charge/discharge the NaS battery 1004 and setting a target value of charge/discharge electric power. "Calculation" includes not only calculation according to an operation formula but also a converting process using a numerical table and a calculating process in an analog arithmetic circuit.

(Calculation of Calculated Value of Discharge Capacity)

The discharge capacity calculator 1130 integrates the charge/discharge current value I of the NaS battery 1004 measured by the Hall current detector 1008, and calculates the calculated value of the discharge capacity of the NaS battery 1004. The discharge capacity calculator 1130 stops the integration of the charge/discharge current value I while the charge/discharge current value I is smaller than a reference value. This is because when the charge/discharge current value I measured by the Hall current detector 1008 is small, an offset of the Hall current detector 1008 is likely to greatly influence the charge/discharge current value I.

(Correction of Calculated Value of Discharge Capacity)

When the NaS battery 1004 as the target for the correction of the calculated value of the discharge capacity is charged/discharged to a depth of discharge at which the correction is made, the discharge capacity calculator 1130 corrects the calculated value of the discharge capacity.

FIG. 5 is a graph illustrating a relationship between the depth of discharge and the voltage of the NaS battery 1004.

As shown in FIG. 5, at a charge end (near left end in the graph of FIG. 5) in a biphasic region where sodium sulfide ($Na_2S_5$) and sulfur (S) are present as cathode active materials, the voltage of the NaS battery 1004 becomes higher as the charge proceeds. In the biphasic region other than the charge end, the voltage is basically constant regardless of the depth of discharge. In the one-phase region where only sodium sulfide ($Na_2S_x$) is present as a cathode active material, the voltage is lowered when the depth of discharge is deep.

Therefore, the calculated value of the discharge capacity is corrected in a state that the NaS battery 1004 is charged until the depth of discharge is the charge end or a state that the NaS battery 1004 is discharged until the depth of discharge is in one-phase region.

(Calculation of SOC)

The SOC calculator 1131 calculates SOC based on a residual capacity determined by the discharge capacity and a rated capacity.

(Operation Form of Power Storage Device 1002)

An operation form of the power storage device 1002 is roughly divided into a pattern operation and an electric power smooth operation.

The pattern operation is for performing the charge/discharge according to a fluctuation in daily power demand. For example, the pattern operation is generally such that the charging is performed at night at which the power demand is low, and the discharge is performed in the daytime in which the power demand is high. When the pattern operation is performed, a charge/discharge electric power for each time is frequently set in advance.

The electric power smooth operation is for performing the charge/discharge according to a shorter fluctuation in the power demand.

(Relationship between Operation of Power Storage Device 1002 and Correction of Calculated Value of Discharge Capacity)

When the power storage device 1002 performs the pattern operation, the NaS battery 1004 is relatively frequently charged/discharged to the depth of discharge at which the correction is made. For this reason, a situation that the NaS battery 1004 should be charged/discharged in order to correct the calculated value of the discharge capacity is relatively less likely to occur.

However, when the power storage device 1002 performs the electric power smooth operation, the NaS battery 1004 is relatively less likely to be charged/discharged to the depth of discharge at which the correction is made, and thus a situation that the NaS battery 1004 should be charged/discharged in order to correct the calculated value of the discharge capacity is relatively likely to occur. On the other hand, since the charge/discharge of the NaS battery 1004 in order to correct the calculated value of the discharge capacity influences the output of the power storage device 1002, it is desirable that the calculated value of the discharge capacity is corrected only when the correction of the calculated value of the discharge capacity is necessary, and unnecessary correction of the calculated value of the discharge capacity is not made. Therefore, in the power storage device 1002 according to the first embodiment, the estimated error Er(t2) of the calculated value of the discharge capacity is calculated and the NaS battery 1004 is set as a candidate for the correction of the calculated value of the discharge capacity only when the estimated error Er(t2) is large and the correction of the calculated value of the discharge capacity is necessary in order to enable the electric power smooth operation. This, however, does not prevent the pattern operation of the power storage device 1002.

(Calculation of Estimated Error Er(t2))

The estimated error calculator 1132 calculates the estimated error Er(t2) of the calculated value of the discharge capacity calculated by the discharge capacity calculator 1130.

(Estimated Error Er(t2))

The estimated error Er(t2) is a group of factors reflecting causes of the error in the calculated value of the discharge capacity. The cause of the error in the calculated value of the discharge capacity includes, for example, a time elapsed from the previous correction of the calculated value of the discharge capacity to present, a time during which the charge/discharge is performed, the charge/discharge electric power, and a level, steepness and the number of the fluctuations in the charge/discharge electric power.

For example, the estimated error Er(t2) in the calculated value of the discharge capacity at current time t2 is calculated as a sum of the following first term and second term according to equation (1).

(First term) Integration of an integrand representing an increase in the estimated error Er(t2) at time t over t from time t1 at which the calculated value of the discharge capacity is previously corrected to current time t2; and (Second term) a product of a correcting amount error in the previous correction of the calculated value of the discharge capacity and a constant e;

[Mathematical Formula 1]

$$Er(t2) = \int_{t1}^{t2} \left\{ a(I) \times \frac{dI}{dt} + b(I) + f(I) \times c(T) + d \right\} dt + e \times \text{error} \quad (1)$$

Instead of the estimated error Er(t2) calculated according to equation (1), the estimated error Er(t2) that is calculated as a product of the first and second terms expressed in equation (2) may be used.

[Mathematical Formula 2]

$$Er(t2) = \int_{t1}^{t2} \left\{ a(I) \times \frac{dI}{dt} + b(I) + f(I) \times c(T) + d \right\} dt \times e \times \text{error} \quad (2)$$

As shown in the first term of equation (1), the estimated error Er(t2) includes a factor expressed by the integration from time t1 at which the calculated value of the discharge capacity is previously corrected to current time t2 (including also a summation in a case of discretization). As a result, when errors are accumulated in the calculated value of the discharge capacity, the NaS battery 1004 quickly becomes a target for the correction of the calculated value of the discharge capacity, and thus the calculated value of the discharge capacity is corrected on a timely basis.

As shown in the second term of equation (1), the estimated error Er(t2) includes a factor that becomes larger as the correcting amount error in the previous correction of the calculated value of the discharge capacity is larger, such as a factor that is proportional to the correcting amount error. Instead of the correcting amount error in one correction, an average value of correcting amounts in two or more corrections may be adopted. As a result, when the error in the calculated value of the discharge capacity easily becomes large, the NaS battery 1004 quickly becomes a target for the correction of the calculated value of the discharge capacity, and thus the calculated value of the discharge capacity is corrected on a timely basis.

The integrand of the integration in the first term of equation (1) is calculated as a sum of the following first to fourth terms.

(First term) A product a(I)×dI/dt of a correction coefficient a(I) as a function of the charge/discharge current value I and a change over time dI/dt in the charge/discharge current value I;

(Second term) a correction coefficient b(I) as a function of the charge/discharge current value I;

(Third term) a product of a correction coefficient f(I) as the function of the charge/discharge current value I and a correction coefficient c(T) as a function of the temperature T inside the housing 1009; and (Fourth term) a correction coefficient d that obtains a value according to the operating state of the bidirectional converter 1112.

The charge/discharge current value I is obtained from the Hall current detector 1008. The temperature T is obtained from the temperature sensor 1110. The operating state of the bidirectional converter 1112 is obtained from the charge/discharge command part 1136.

It is desirable that the first term of the integrand is a factor that becomes larger as the change over time dI/dt is larger. As a result, when the errors caused by the response speed of the Hall current detector 1008, the frequency characteristic of the Hall current detector 1008, a measuring interval of the charge/discharge current I and so on greatly influence the calculated value of the discharge capacity, the NaS battery 1004 quickly becomes a target for the correction of the calculated value of the discharge capacity. For this reason, the calculated value of the discharge capacity is corrected on a timely basis.

Since the frequency characteristic of the Hall current detector 1008 is slightly influenced by the charge/discharge current value I, the correction coefficient a(I) is desirably the function of the charge/discharge current value I. When accuracy of the estimated error Er(t2) is allowed to be slightly reduced, the correction coefficient a(I) may be a constant that does not depend on the charge/discharge current value I. In this case, the first term of the integrand is a factor that is proportional to the change over time dI/dt.

As shown in equations (3) and (4), it is desirable that the change over time dI/dt in the first term of the integrand of the estimated error Er(t2) calculated according to equations (1) and (2) is replaced by an absolute value dI/dt I of the change over time dI/dt. In both cases where the charge/discharge current value I increases and decreases, the calculated value of the discharge capacity is influenced greater than a case where the charge/discharge current value I does not change. For this reason, the change over time dI/dt is replaced by the absolute value |dI/dt| of the change over time dI/dt, so that the estimated error Er(t2) is suitably calculated in both the cases where the charge/discharge current value I increases and decreases.

[Mathematical Formula 3]

$$Er(t2) = \int_{t1}^{t2} \left\{ a(I) \times \left| \frac{dI}{dt} \right| + b(I) + f(I) \times c(T) + d \right\} dt + e \times \text{error} \quad (3)$$

[Mathematical Formula 4]

$$Er(t2) = \int_{t1}^{t2} \left\{ a(I) \times \left| \frac{dI}{dt} \right| + b(I) + f(I) \times c(T) + d \right\} dt \times e \times \text{error} \quad (4)$$

The correction coefficient b(I) in the second term of the integrand desirably includes a factor that becomes larger as the charge/discharge current value I is larger, such as a factor that is proportional to the charge/discharge current value I. As a result, when an error caused by the nonlinearity of the Hall current detector 1008, an error that is proportional to the charge/discharge current value I included in the charge/discharge current value I measured by the Hall current detector 1008 and so on greatly influence the state of charge, the NaS battery 1004 quickly becomes the target for the correction of the calculated value of the discharge capacity. For this reason, the calculated value of the discharge capacity is corrected on a timely basis.

Further, when the charge/discharge current value I is smaller than the reference value, the correction coefficient b(I) desirably includes a factor that becomes larger as the charge/discharge current value I is larger, such as a factor that is proportional to the charge/discharge current value I. As a result, when an error caused by interrupting the integration of the charge/discharge current values I in the discharge capacity calculator 1130 greatly influences the calculated value of the discharge capacity, the NaS battery 1004 quickly becomes the target for the correction of the calculated value of the discharge capacity. For this reason, the calculated value of the discharge capacity is corrected on a timely basis.

Further, it is desirable that the correction coefficient b(I) includes a factor that becomes larger as an offset of the Hall current detector 1008 is larger, such as a factor that is proportional to the offset of the Hall current detector 1008. As a result, when an error caused by the offset of the Hall current detector 1008 greatly influences the calculated value of the discharge capacity, the NaS battery 1004 quickly becomes the target for the correction of the calculated value of the discharge capacity. For this reason, the calculated value of the discharge capacity is corrected on a timely basis.

The offset of the Hall current detector 1008 tends to be large after a large charge/discharge current flows. In general, the offset of the Hall current detector 1008 is calculated based on a history of the charge/discharge current value I.

It is desirable that the correction coefficient c(T) in the third term of the integrand is a factor that becomes larger as the temperature T deviates further from a reference temperature. The reference temperature is set to, for example, 25° C. As a result, when an error caused by a temperature characteristic of the temperature sensor 1110 greatly influences the calculated value of the discharge capacity, the NaS battery 1004 quickly becomes the target for the correction of the calculated value of the discharge current. For this reason, the calculated value of the discharge capacity is corrected on a timely basis.

The offset of the Hall current detector 1008 may have a positive temperature coefficient or a negative temperature coefficient, or may change when the temperature T changes irregularly. For this reason, it is desirable that the temperature characteristic of the Hall current detector 1008 is actually measured and the correction coefficient c(T) is set.

Since the temperature T does not have a strong influence when the charge/discharge current value I is small, the correction coefficient c(T) is multiplied by the correction coefficient f(I) that becomes small when the charge/discharge current value I is small. When the accuracy of the estimated error Er(t2) is allowed to be slightly deteriorated, the correction coefficient f(I) may be a constant that does not depend on the charge/discharge current value I.

It is desirable that the correction coefficient d in the fourth term of the integrand is a factor that reflects the operating state of the bidirectional converter 1112, such as a factor that becomes 0 when the bidirectional converter 1112 is stopped and thus the charge/discharge current does not flow, becomes a constant dl when the bidirectional converter 1112 is operated and thus the charge/discharge current flows, and becomes a constant d2 when the bidirectional converter 1112 is in stand-by and a slight charge/discharge current is likely to flow. The constant dl is larger than the constant d2 (d1>d2). As a result, when an error caused by the operating state of the bidirectional converter 1112 greatly influences the calculated value of the discharge capacity, the NaS battery quickly becomes the target for the correction of the calculated value of the discharge capacity, and thus the calculated value of the discharge capacity is corrected on a timely basis.

When the Hall current detector 1008 includes an A/D converter, a quantization error due to A/D conversion occurs. When the quantization error greatly influences the calculated value of the discharge capacity, the NaS battery quickly becomes the target for the correction of the calculated value of the discharge capacity due to the correction coefficient d, and thus the calculated value of the discharge capacity is corrected on a timely basis.

Equation (1) is allowed to be varied. For example, when the accuracy of the estimated error Er(t2) is allowed to be slightly lowered and resources to be used for the calculation of the estimated error Er(t2) are required to be reduced, a factor whose contribution is small in the above factors may be omitted. Further, when resources to be used for the calculation of the estimated error Er(t2) are allowed to be increased, factors other than the above factors may be included in the estimated error Er(t2).

(Significance in Calculation of Estimated Error Er(t2))

It is considered that the charge/discharge current value I is corrected according to the causes of the error in the calculated value of the discharge capacity, and the corrected charge/discharge current value I is integrated so that the discharge capacity is calculated. However, such correction has problems such that it is difficult to take a secular change and uncertainty into consideration, and a lot of calculation resources are required.

On the contrary, when the estimated error Er(t2) is calculated and the calculated value of the discharge capacity is corrected on a timely basis, relatively less calculation resources is required.

(Comparison between Estimated Error Er(t2) and Threshold TH)

The comparator 1140 obtains the estimated error Er(t2) from the estimated error calculator 1132, and compares the estimated error Er(t2) with the threshold TH. When the estimated error Er(t2) exceeds the threshold TH, the NaS battery 1004 is set as the candidate for the correction of the calculated value of the discharge capacity. As a result, since the NaS battery 2004 where the estimated error Er(t2) exceeds the threshold TH becomes the candidate for the correction of the calculated value of the discharge capacity, the calculated value of the discharge capacity of the NaS battery 2004 is corrected when the correction of the calculated value of the discharge capacity is necessary, and unnecessary correction of the calculated value of the discharge capacity is not made.

(Charge/Discharge Command and Target Value of Charge/Discharge Electric Power)

The charge/discharge command part 1136 outputs a charge/discharge command signal to the bidirectional converter 1112. As a result, the NaS battery 1004 that is the target for the correction of the calculated value of the discharge capacity is charged/discharged to the depth of discharge at which the correction is made. When outputting the charge/discharge command signal, the charge/discharge command part 1136 sets the target value of the charge/discharge electric power and outputs it to the bidirectional converter 1112. The NaS battery 1004, that is set as the candidate for the correction of the calculated value of the discharge capacity by the comparator 1140, directly becomes the target for the correction of the discharge capacity. The charge/discharge for the correction of the discharge capacity may be allowed only when the current time is in a time zone where the correction of the discharge capacity is allowed.

(Manual Correction of Calculated Value of Discharge Capacity)

The automatic correction of the calculated value of the discharge capacity, that causes the NaS battery 1004, that is the candidate for the correction of the calculated value of the discharge capacity, to be automatically discharged to the depth of discharge at which the calculated value of the discharge capacity is corrected, may be stopped. The NaS battery 1004 that is the candidate for the correction of the calculated value of the discharge capacity may be manually discharged to the depth of discharge at which the calculated value of the discharge capacity is corrected.

In order to enable such manual correction of the calculated value of the discharge capacity, the power storage device 1002 displays the estimated error Er(t2) of the calculated value of the discharge capacity in the NaS battery 1004 and whether the estimated error Er(t2) exceeds the threshold TH on the display part 1115, and accepts a command for correcting the calculated value of the discharge capacity via the manipulation part 1117. In addition to the command for correcting the calculated value of the discharge capacity, the manipulation part 1117 may accept an input of time at which the charge/discharge for the correction of the calculated value of the discharge capacity starts. The command for correcting the calculated value of the discharge capacity whose input is accepted by the manipulation part 1117 is sent to the charge/discharge command part 1136. When the charge/discharge command part 1136 receives the command for correcting the calculated value of the discharge capacity, it causes the bidirectional converter 1112 to charge/discharge the NaS battery 1004 to the depth of discharge at which the correction is made.

When the calculated value of the discharge capacity is manually corrected, an operator of the power storage device 1002 refers to information displayed on the display part 1115, and inputs the command for correcting the calculated value of the discharge capacity via the manipulation part 1117 after the current and future conditions of the microgrid including the power storage device 1002 are taken into consideration. Items that are considered by the operator include a dispersion type power source that is undergoing a maintenance check or is to undergo a maintenance check, power demand estimate of a load derived from a temperature, and an electricity trading plan between the microgrid and an external macro system.

(2. Second Embodiment)

A second embodiment relates to a power storage device 2002.

(Outline of Power Storage Device 2002)

Figure 6:
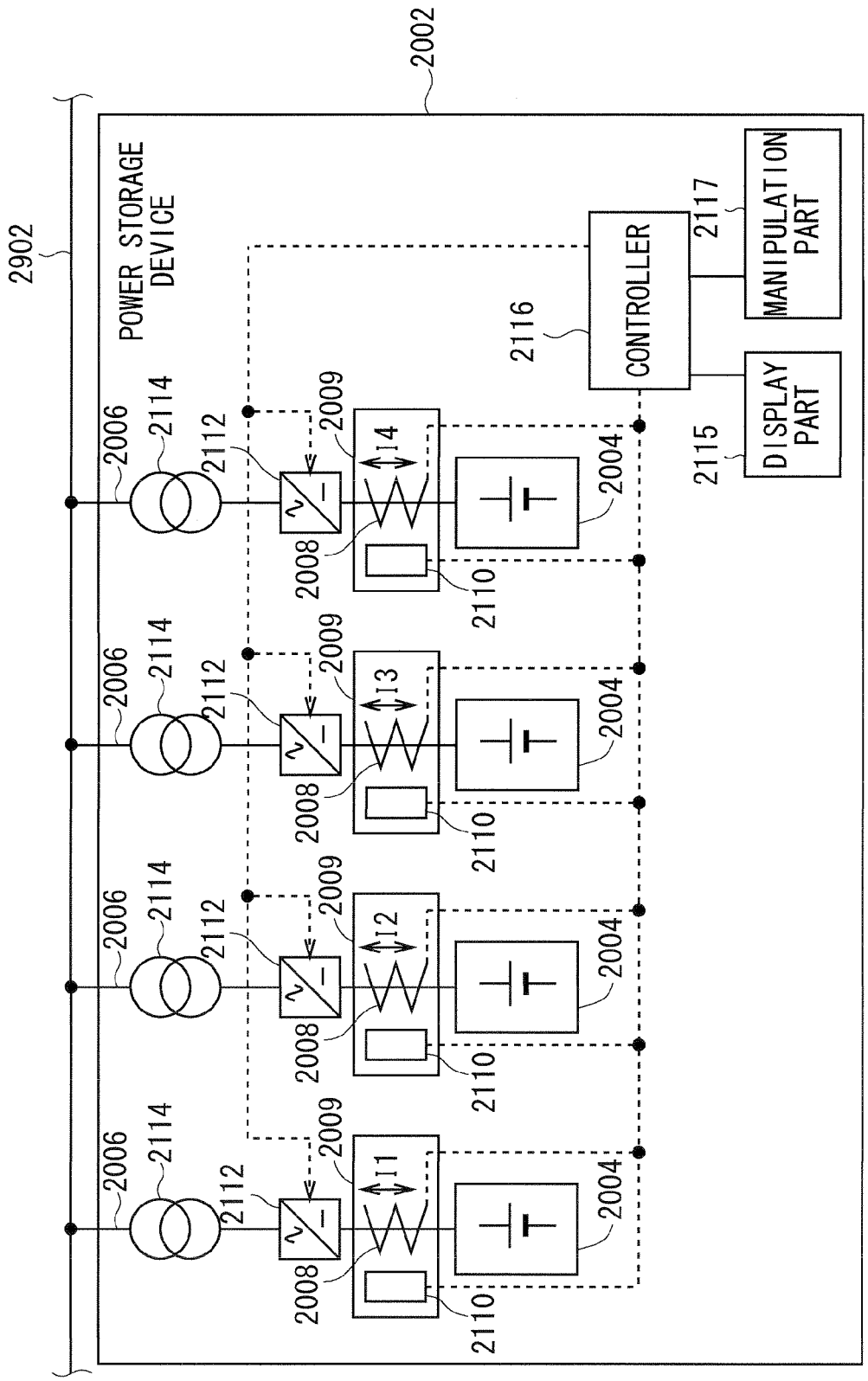
FIG. 6 is a block diagram illustrating the power storage device according to a second embodiment.

FIG. 6 is a block diagram illustrating the power storage device 2002 according to the second embodiment.

As shown in FIG. 6, the power storage device 2002 has NaS batteries 2004 for storing electric power, connecting lines 2006 for connecting a system 2902 and the NaS batteries 2004, Hall current detectors 2008 for measuring the charge/discharge current values Tm (m=1, 2, 3 and 4) of the NaS batteries 2004, housings 2009 for housing the Hall current detectors 2008, temperature sensors 2110 for measuring temperatures Tm (m=1, 2, 3 and 4) inside the housings 2009, bidirectional converters 2112 for converting electric power supplied from the NaS batteries 2004 to the system 2902 from a direct current into an alternating current and converting electric power supplied from the system 2902 to the NaS batteries 2004 from an alternating current into a direct current, transformers 2114 for stepping up the electric power supplied from the NaS batteries 2004 to the system 2902 and stepping down the electric power supplied from the system 2902 to the NaS 2004 batteries, a controller 2116 for controlling the power storage device 2002, a display part 2115 for displaying information, and a manipulation part 2117 for accepting a manipulation.

The connecting line 2006, the Hall current detector 2008, the bidirectional converter 2112 and the transformer 2114 are provided to each of a plurality of NaS batteries 2004 one by one, and the Hall current detector 2008, the bidirectional converter 2112 and the transformer 2114 are put into the connecting line 2006. The Hall current detector 2008 is connected to a direct current side of the bidirectional converter 2112, and the transformer 2114 is connected to an alternating current side of the bidirectional converter 2112. Each of the plurality of Hall current detectors 2008 is housed in each of the housings 2009. Two or more of the plurality of Hall current detectors 2008 may be housed in one housing, or all the plurality of Hall current detectors 2008 may be housed in one housing. The temperature sensor 2110 is provided to each of the plurality of housings 2009 one by one. When two or more of the Hall current detectors 2008 are housed in one housing, the temperature sensor 2110 is provided to each housing, and the two or more Hall current detectors 2008 share one temperature sensor 2110.

FIG. 6 illustrates four NaS batteries 2004, but the number of the NaS batteries is increased or decreased according to specifications of the power storage device 2002. Instead of the NaS batteries, another kind of secondary batteries may be adopted.

The Hall current detectors 2008, the temperature sensors 2110, the bidirectional converters 2112, the transformers 2114, the controller 2116, the display part 2115 and the manipulation part 2117 compose a NaS battery control device that controls the plurality of NaS batteries 2004. The controller 2116 integrates charge/discharge current value Im of an mth (m=1, 2, 3, 4) NaS battery 2004, calculates the discharge capacity of the mth (m=1, 2, 3, 4) NaS battery 2004, and calculates SOC based on the calculated value of the discharge capacity. The controller 2116 specifies the NaS batteries 2004 where the correction of the calculated value of the discharge capacity are necessary as candidates for the correction of the calculated value of the discharge capacity, charges/discharges all or some of the specified NaS batteries 2004 to the discharge capacity with which the correction is made, and corrects the calculated values of the discharge capacities in the charged/discharged NaS batteries 2004.

As the NaS batteries 2004, the Hall current detectors 2008, the temperature sensors 2110, the bidirectional converters 2112 and the transformers 2114 according to the second embodiment, those that are similar to the NaS battery 1004, the Hall current detector 1008, the temperature sensor 1110, the bidirectional converter 1112 and the transformer 1114 according to the first embodiment are adopted.

(Outline of Controller 2116)

FIG. 7 is a block diagram illustrating the controller 2116. The respective blocks in FIG. 7 may be realized by causing a built-in computer having at least a CPU and a memory to execute a control program, or by hardware. The controller 2116 transmits charge/discharge command value of each of the plurality of NaS batteries 2004 to each of the plurality of bidirectional converters 2112 so that the input charge/discharge electric power command value match with a sum of the charge/discharge electric powers of the plurality of NaS batteries 2004. The charge/discharge electric power command value may be input from the manipulation part 2117 or may be input from the microgrid control system of the microgrids including the power storage device 2002 via the communication line.

As shown in FIG. 7, the controller 2116 has a discharge capacity calculator 2130 for calculating the calculated values of the discharge capacities in the NaS batteries 2004, a SOC calculator 2131 for calculating SOCs of the NaS batteries 2004, an estimated error calculator 2132 for calculating an estimated errors Erm(t2) (m=1, 2, 3, 4) of the calculated values of the discharge capacities calculated by the discharge capacity calculator 2130, a correction target determinator 2134 for determining the NaS batteries 2004 that are targets for the correction of the calculated values of the discharge capacities, a charge/discharge command part 2136 for commanding the bidirectional converters 2112 to charge/discharge the NaS batteries 2004 and setting the target values of the charge/discharge electric power. The discharge capacity calculator 2130, the estimated error calculator 2132 and the SOC calculator 2131 may be provided to each of the plurality of NaS batteries 2004 one by one, or may be shared by all the NaS batteries 2004.

(Calculation of Calculated Value of Discharge Capacity)

The discharge capacity calculator 2130 integrates the charge/discharge current value Im of each of the plurality of NaS batteries 2004 measured by the Hall current detector 2008, and calculates the calculated value of the discharge capacity in each of the plurality of NaS batteries 2004. However, the discharge capacity calculator 2130 stops the integration of the charge/discharge current values Im while the charge/discharge current values Im are smaller than the reference value.

(Correction of Calculated Value of Discharge Capacity)

When the NaS batteries 2004 that are the targets for the correction of the calculated values of the discharge capacities are charged/discharged to the depth of discharge at which the correction is made, the discharge capacity calculator 2130 corrects the calculated values of the discharge capacities.

(Calculation of SOC)

The SOC calculator 2131 calculates SOC of each of the plurality of NaS batteries based on a residual capacity determined by the discharge capacities and a rated capacity.

(Influence of Correction of Calculated Values of Discharge Capacities on Output of Power Storage Device 2002)

The charge/discharge for the correction of the calculated values of the discharge capacities occasionally influences the output of the power storage device 2002. Differently from the power storage device 1002 according to the first embodiment, the power storage device 2002 according to the second embodiment has a plurality of NaS batteries 2004. For this reason, when a relationship such that P2=PIN−P1 is established among a total P1 of the charge/discharge electric powers of the NaS batteries 2004 charged/discharged for the correction of the discharge capacities, a total P2 of the charge/discharge electric powers of the NaS batteries 2004 other than the NaS batteries 2004 charged/discharged for the correction of the discharge capacities and the input charge/discharge electric power command value PIN, the output of the power storage device 2002 does not have to be changed. When this relationship is not established, the output of the power storage device 2002 is changed or the charge/discharge for the correction of the discharge capacity should be stopped.

(Calculation of Estimated Error Erm(t2))

The estimated error calculator 2132 calculates the estimated error Erm(t2) of the calculated value of the discharge capacity calculated by the discharge capacity calculator 2130 as to each of the plurality of NaS batteries 2004.

(Estimated Error Erm(t2))

The estimated errors Erm(t2) are a group of factors that reflects causes of the errors in the calculated values of the discharge capacities. The causes of the errors in the calculated values of the discharge capacities include, for example, a time elapsed from the previous correction of the calculated value of the discharge capacity to a current time, a time during which the charge/discharge is performed, a charge/discharge electric power, and a level, steepness and the number of fluctuations in the charge/discharge electric power.

For example, the estimated error Erm(t2) of the calculated value of the discharge capacity in the mth NaS battery 2004 at current time t2 is calculated as a sum of the following first and second terms according to equation (5).

(First term) Integration of an integrand representing an increase in the estimated error Erm(t2) at time t over t from time t1 at which the calculated value of the discharge capacity is previously corrected to current time t2; and (Second term) a product of a correcting amount errorm in the previous correction of the calculated value of the discharge capacity and a constant e.

[Mathematical Formula 5]

$$Erm(t2) = \int_{t1}^{t2} \left\{ a(\text{Im}) \times \frac{d\text{Im}}{dt} + b(\text{Im}) + f(\text{Im}) \times c(T) + d \right\} dt + e \times \text{error} \quad (5)$$

Equation (5) is similar to equation (1) except that the charge/discharge current value "I" is replaced by "Im", the correcting amount "error" is replaced by "errorm", and the measured error "Er(t2)" is replaced by "Erm(t2)".

As shown in equation (6), it is desirable that a change over time dIm/dt in the first term of the integrand of the estimated error Er(t2) calculated by equation (5) is replaced by an absolute value |dIm/dt| of the change over time dIm/dt.

[Mathematical Formula 6]

$$Erm(t2) = \int_{t1}^{t2} \left\{ a(\text{Im}) \times \left| \frac{d\text{Im}}{dt} \right| + b(\text{Im}) + f(\text{Im}) \times c(T) + d \right\} dt + e \times \text{error} \quad (6)$$

According to this operation formula, when the error greatly influences the calculated value of the discharge capacity, the NaS battery 2004 quickly becomes the target for the correction of the calculated value of the discharge capacity. For this reason, the calculated value of the discharge capacity is corrected on a timely basis, and the target for the correction of the calculated value of the discharge capacity is suitably selected.

(Determination of Target for Correction of Calculated Value of Discharge Capacity)

Figure 8:
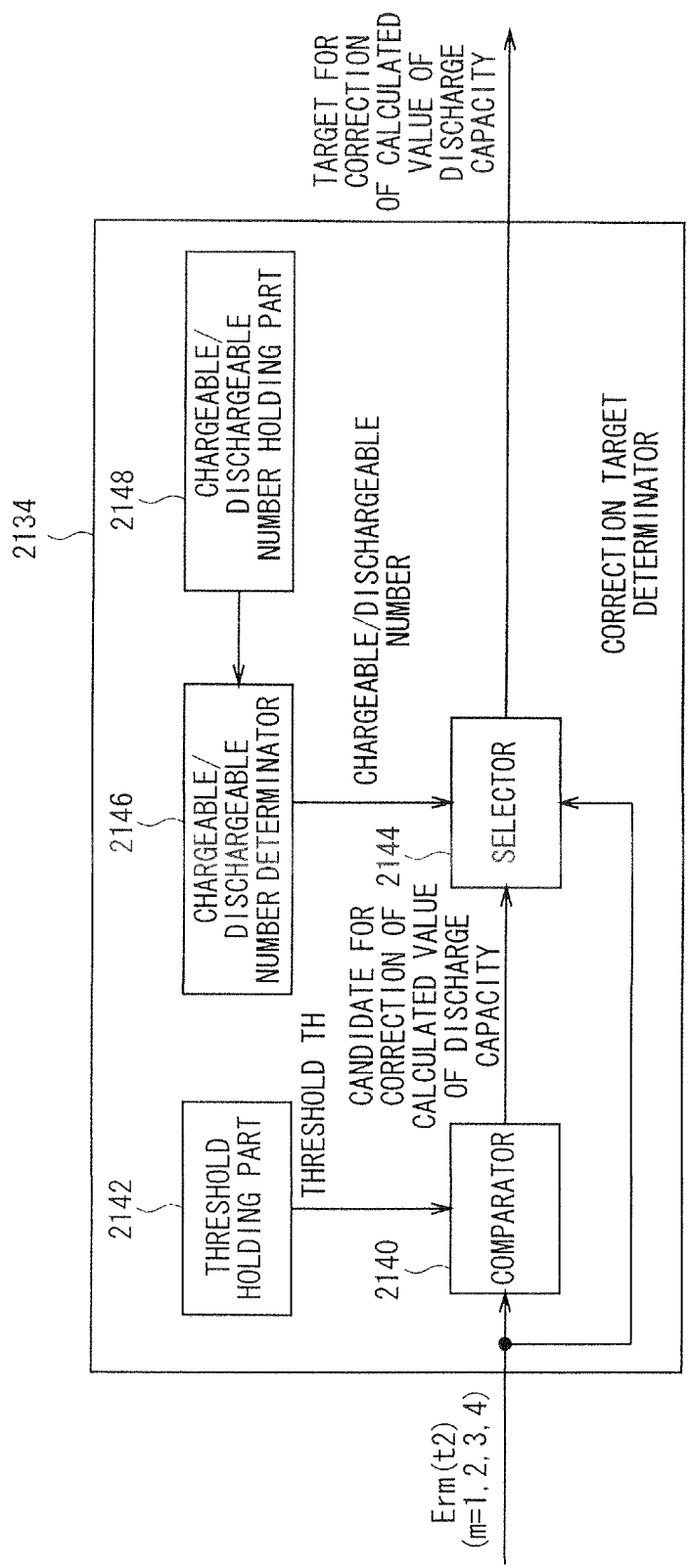
FIG. 8 is a block diagram illustrating a correction target determinator according to the second embodiment.

FIG. 8 is a block diagram illustrating the correction target determinator 2134.

As shown in FIG. 8, the correction target determinator 2134 has a comparator 2140 for comparing the estimated errors Erm(t2) with the threshold TH, a threshold holding part 2142 for holding the threshold TH, a selector 2144 for selecting the NaS batteries 2004 that are the targets for the correction of the calculated values of the discharge capacities, a chargeable/dischargeable number determinator 2144 for determining the number of the NaS batteries 2004 capable of being charged/discharged for the correction of the calculated values of the discharge capacities in a time zone to which the current time belongs (hereinafter, referred to as "chargeable/dischargeable number"), and a chargeable/dischargeable number holding part 2148 for holding the chargeable/dischargeable number in each time zone.

The comparator 2140 obtains the estimated error Erm(t2) of the each of plurality of NaS batteries 2004 from the estimated error calculator 2132, and compares the estimated error Erm(t2) with the threshold TH as to each of plurality of NaS batteries 2004, and sets the NaS batteries 2004 where the estimated errors Erm(t2) exceed the threshold TH as the candidates for the correction of the calculated values of the discharge capacities. As a result, since the NaS batteries 2004 where the estimated errors Er(t2) exceed the threshold TH become the candidates for the correction of the calculated values of the discharge capacities, the calculated values of the discharge capacities in the NaS batteries 2004 requiring the correction of the calculated values of the discharge capacities are corrected, and the unnecessary correction of the calculated values of the discharge capacities is not made.

The selector 2144 selects one NaS battery 2004 where estimated error Erm(t2) is the largest as the target for the correction of the calculated value of the discharge capacity from the NaS batteries 2004 as the candidates for the correction of the calculated values of the discharge capacities. As a result, since the correction of the calculated values of the discharge capacities in the two or more NaS batteries 2004 is not simultaneously started, an influence on the output of the power storage device 2002 is suppressed.

It is not essential that the number of the NaS batteries 2004 as the targets for the correction of the calculated value of the discharge capacity is one. That is, in general, the selector 2144 selects the NaS batteries 2004 to an allowed number in descending order of the estimated errors Erm (t2) as the targets for the correction of the calculated values of the discharge capacities from the NaS batteries 2004 as the candidates for the correction of the calculated values of the discharge capacities. As a result, since the correction of the calculated values of the discharge capacities in more than the allowable number of the NaS batteries 2004 is not simultaneously started, the influence on the output of the power storage device 2002 is suppressed.

"The allowable number" means the number that is obtained by subtracting the number of the NaS batteries 2004 where the charge/discharge is actually performed for the correction of the calculated values of the discharge capacities from the chargeable/dischargeable number.

A chargeable/dischargeable number determinator 2146 refers to the information held in the chargeable/dischargeable number holding part 2148, and determines the chargeable/dischargeable number in that time zone.

When the chargeable/dischargeable number is not limited, a limitation such that only some NaS batteries 2004 in the candidates for the correction of the calculated values of the discharge capacities should be the targets for correction of the calculated values of the discharge capacities is eliminated. For this reason, the selector 2144, the chargeable/dischargeable number determinator 2146 and the chargeable/dischargeable number holding part 2148 are omitted, and thus all the NaS batteries 2004 as the candidates for the correction of the calculated values of the discharge capacities become the targets for the correction of the calculated values of the discharge capacities.

(Process for Determining Targets for Correction of Calculated Values of Discharge Capacities)

Figure 9:
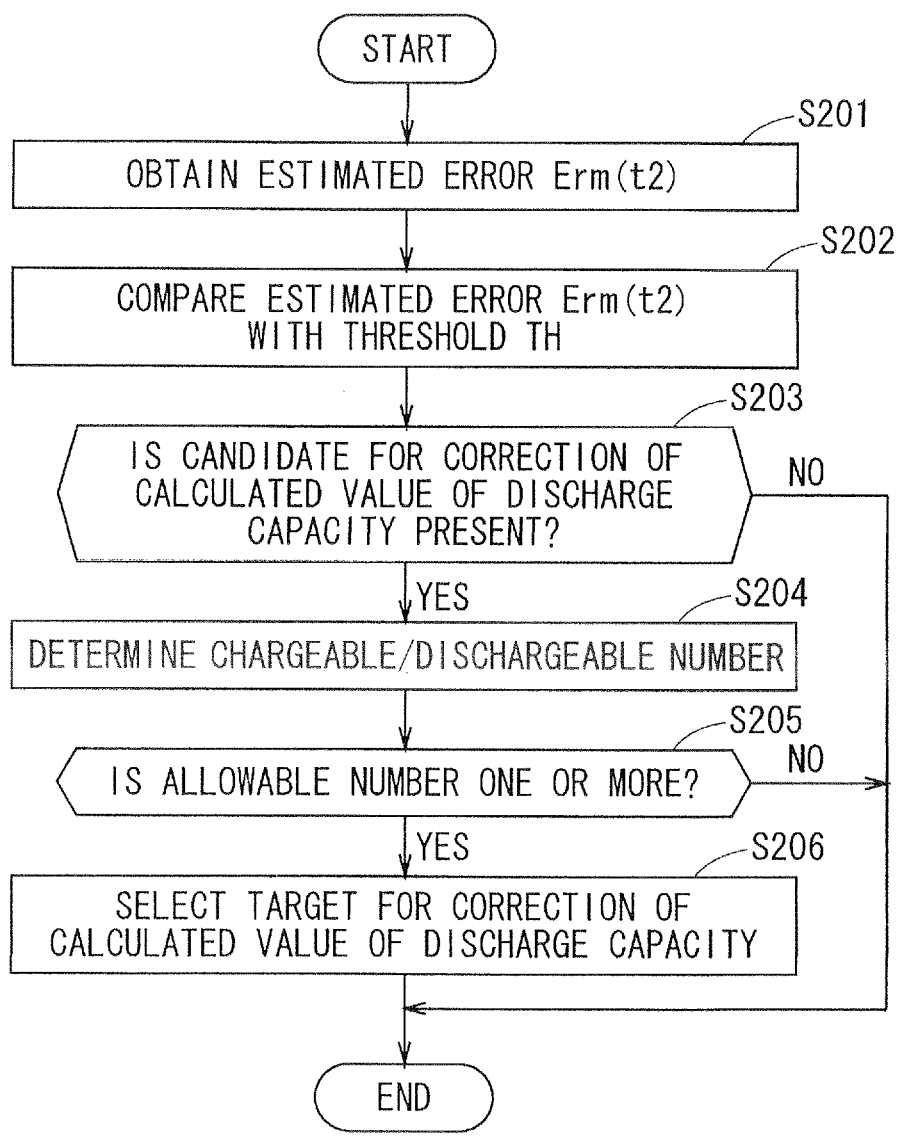
FIG. 9 is a flowchart illustrating a process for determining a target for the correction of a calculated value of a discharge capacity according to the second embodiment.

FIG. 9 is a flowchart illustrating a process to be repeated for determining the targets for the correction of the calculated values of the discharge capacities.

As shown in FIG. 9, when the target for the correction of the calculated value of the discharge capacity is determined, the estimated error Erm(t2) of each of the plurality of NaS batteries 2004 is obtained from the estimated error calculator 2132 (step S201).

After the estimated errors Erm(t2) are obtained, the comparator 2140 compares the estimated errors Erm(t2) with the threshold TH, and specifies the NaS batteries 2004 as the candidates for the correction of the calculated values of the discharge capacities (step S202).

As a result of the comparison with the threshold TH, when the NaS batteries 2004 as the candidates for the correction of the calculated values of the discharge capacities are not present ("NO" in step S203), the NaS battery 2004 as the candidate for the correction of the calculated value of the discharge capacity is not selected, and the process is ended.

On the other hand, when the NaS batteries 2004 as the candidates for the correction of the calculated values of the discharge capacities are present ("YES" in step S203), the chargeable/dischargeable number determinator 2146 determines the chargeable/dischargeable number in a time zone to which current time belongs (step S204).

As a result, when the number of the NaS batteries 2004 where the correction of the calculated values of the discharge capacities are allowed is one or more ("YES" in step S205), the selector 2144 selects the NaS batteries 2004 as the targets for the correction of the calculated values of the discharge capacities (step S206). When the number is 0, the NaS batteries 2004 as the targets for the correction of the calculated values of the discharge capacities are not selected and the process is ended.

(Charge/Discharge Command and Target Value of Charge/Discharge Electric Power)

The charge/discharge command part 2136 outputs the charge/discharge command signal to the bidirectional converter 2112 that is inserted into the connecting line 2006 for connecting the NaS batteries 2004 as the targets for the correction of the calculated values of the discharge capacities and the system 2902. As a result, the NaS batteries 2004 as the targets for the correction of the calculated values of the discharge capacities are charged/discharged to the depth of discharge at which the correction is made. When outputting the charge/discharge command signal, the charge/discharge command part 2136 sets the target value of the charge/discharge electric power, and outputs it to the bidirectional converter 2112.

(Manual Correction of Calculated Value of Discharge Capacity)

Also in the power storage device 2022 according to the second embodiment, in order that the manual correction of the calculated value of the discharge capacity is enabled similarly to the power storage device 1022 according to the first embodiment, and the display part 2115 displays the estimated errors Erm(t2) of the calculated values of the discharge capacities in the plurality of NaS batteries 2004 and whether the estimated errors Erm(t2) exceed the threshold TH. The manipulation part 2117 accepts an input of the command for discharging to the depth of discharge at which the calculated value of the discharge capacity is corrected as to each of the plurality of NaS batteries 2004.

(3. Third Embodiment)

A third embodiment relates to a correction target determinator 3134 that is adopted instead of the correction target determinator 2134 according to the second embodiment.

Figure 10:
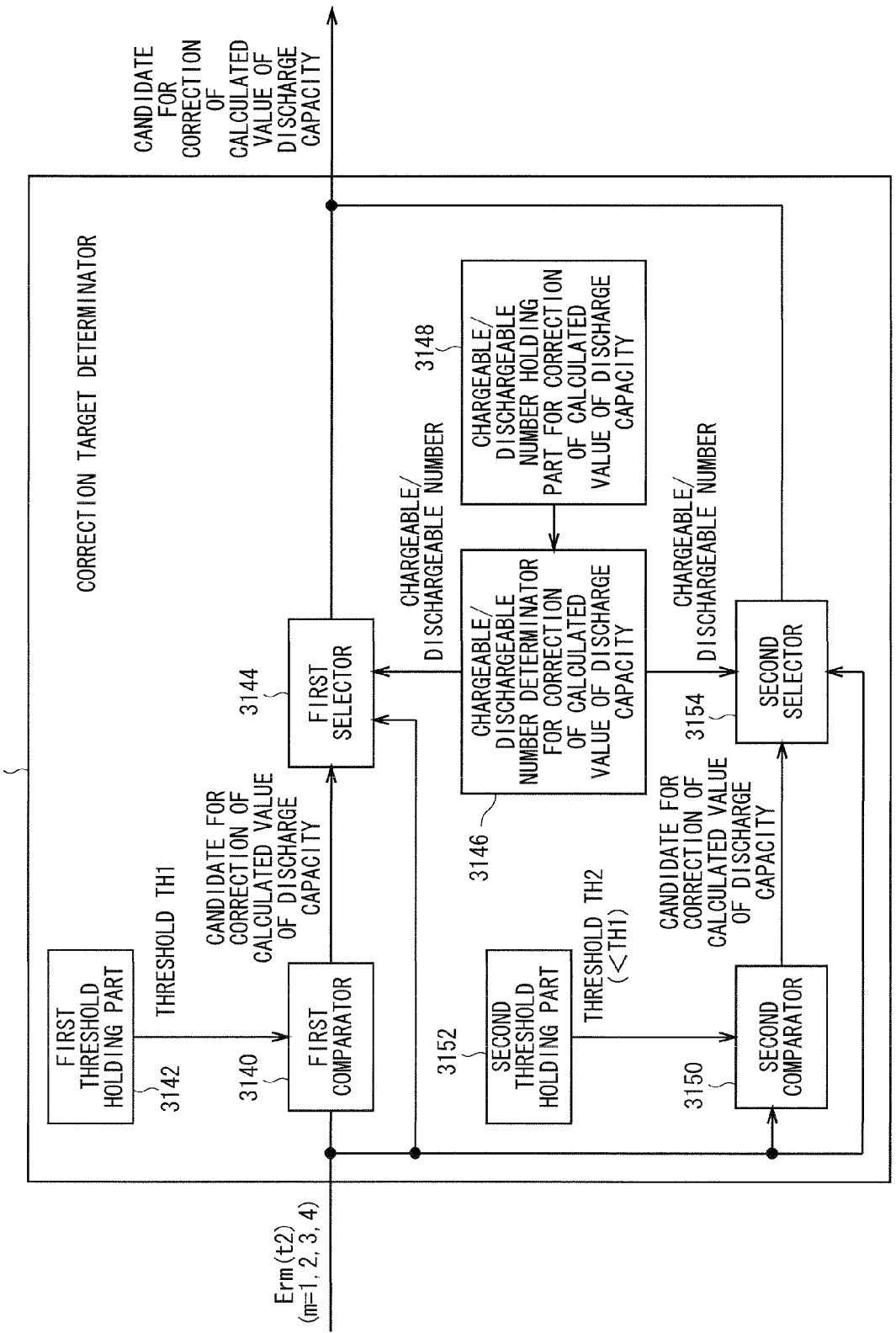
FIG. 10 is a block diagram illustrating the correction target determinator according to a third embodiment.

FIG. 10 is a block diagram illustrating the correction target determinator 3134 according to the third embodiment.

As shown in FIG. 10, the correction target determinator 3134 has a first comparator 3140 for comparing the estimated errors Erm(t2) with a first threshold TH1, a first threshold holding part 3142 for holding the first threshold TH1, a first selector 3144 for selecting the NaS batteries 2004 as the candidates for the correction of the calculated values of the discharge capacities, a second comparator 3150 for comparing the estimated errors Erm(t2) with a second threshold TH2, a second threshold holding part 3152 for holding the second threshold TH2, a second selector 3154 for selecting the NaS batteries 2004 as the targets for the correction of the calculated values of the discharge capacities, a chargeable/dischargeable number determinator 3146 for determining a chargeable/dischargeable number in a time zone to which current time belongs, and a chargeable/dischargeable number holding part 3148 for holding the chargeable/dischargeable numbers in respective time zones. The second threshold TH2 does not exceed the first threshold TH1 (TH2<TH1).

Similarly to the comparator 2140 according to the second embodiment, the first comparator 3140 obtains the estimated error Erm(t2) of the calculated value of the discharge capacity in each of the plurality of NaS batteries 2004 from the estimated error calculator 2132, and compares the estimated error Erm(t2) with the first threshold TH1 as to each of the plurality of NaS batteries 2004. The NaS batteries 2004 where the estimated errors Erm(t2) exceed the first threshold TH1 are set as the candidates for the correction of the calculated values of the discharge capacities.

Similarly to the selector 2144 according to the second embodiment, the first selector 3144 selects one NaS battery with the largest estimated error Erm(t2) from the NaS batteries 2004 set as the candidates for the correction of the calculated values of the discharge capacities by the first comparator 3140. The NaS batteries 2004 may be selected to an allowed number in descending order of the estimated errors Erm (t2) from the NaS batteries 2004 set as the candidates for the correction of the calculated values of the discharge capacities by the first comparator 3140. The first selector 3144 is omitted, and all the NaS batteries 2004 that are set as the candidates for the correction of the calculated values of the discharge capacities may be set as the targets for the correction of the calculated values of the discharge capacities.

The second comparator 3150 compares the estimated error Erm(t2) with the second threshold TH2 as to each of the plurality of NaS batteries 2004, and sets the NaS batteries 2004 where the estimated errors Erm(t2) exceed the second threshold TH2 as the candidates for the correction of the calculated values of the discharge capacities.

When the number of the NaS batteries 2004 set as the candidates for the correction of the calculated values of the discharge capacities by the second comparator 3150 is two or more, the second selector 3154 selects one NaS battery 2004 with the largest estimated error Erm(t2) as the target for the correction of the calculated value of the discharge capacity from the NaS batteries 2004 set as the candidates for the correction of the calculated values of the discharge capacities by the second comparator 3150. NaS batteries 2004 may be selected to an allowed number in descending order of the estimated errors Erm(t2) from the NaS batteries 2004 set as the candidates for the correction of the calculated values of the discharge capacities by the second comparator 3150. Further, when the number of the NaS batteries 2004 set as the candidates for the correction of the calculated values of the discharge capacities by the second comparator 3150 is one or less, the second selector 3154 does not select the target for the correction of the calculated value of the discharge capacity. The second selector 3154 is omitted, and all the NaS batteries 2004 set as the candidates for the correction of the calculated values of the discharge capacities by the second comparator 3150 may be the targets for the correction of the calculated values of the discharge capacities.

(Process for Determining Target for Correction of Calculated Value of Discharge Capacity)

Figure 11:
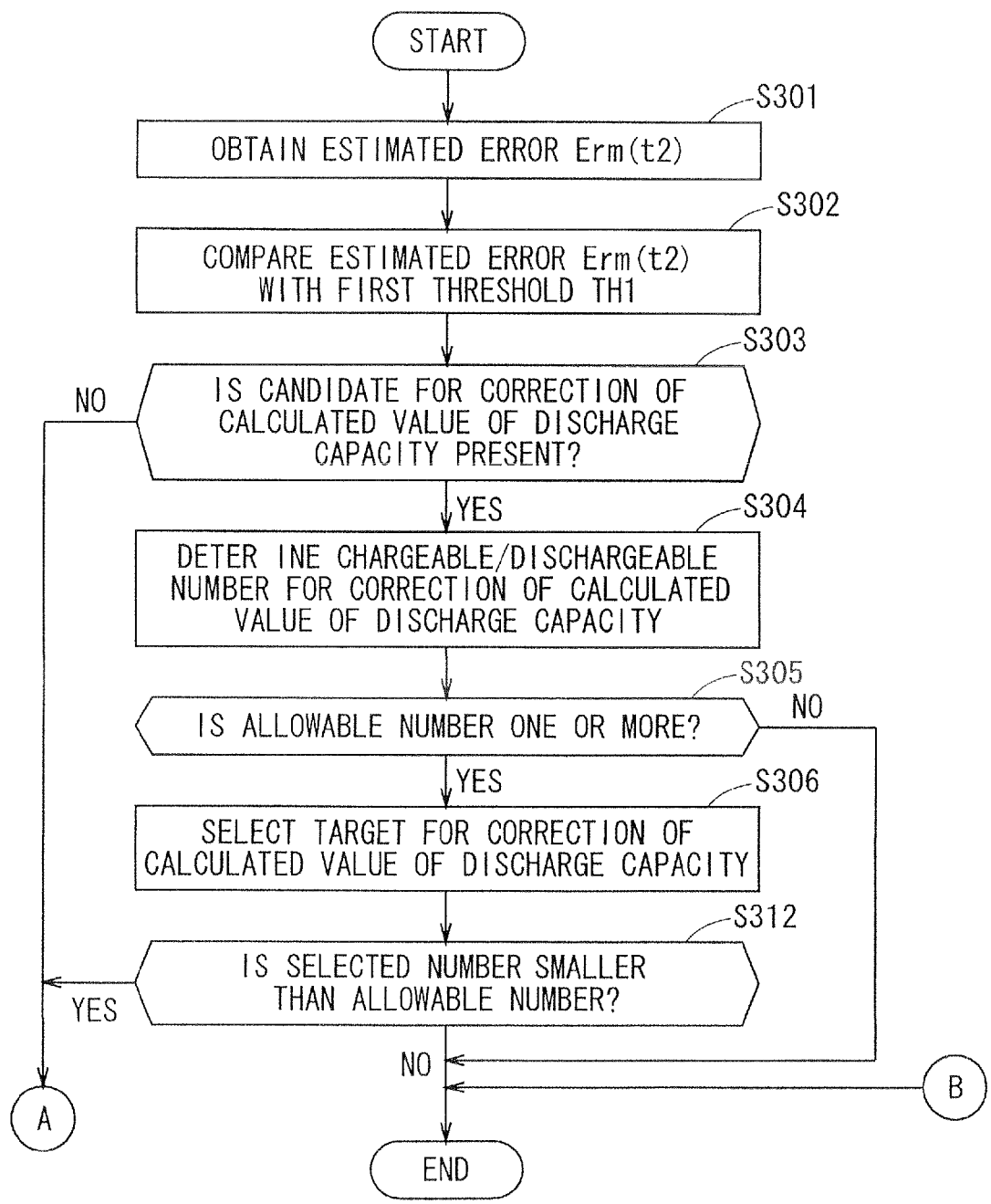
FIG. 11 is a flowchart illustrating a process for determining a target for the correction of the calculated value of the discharge capacity according to the third embodiment.
Figure 12:
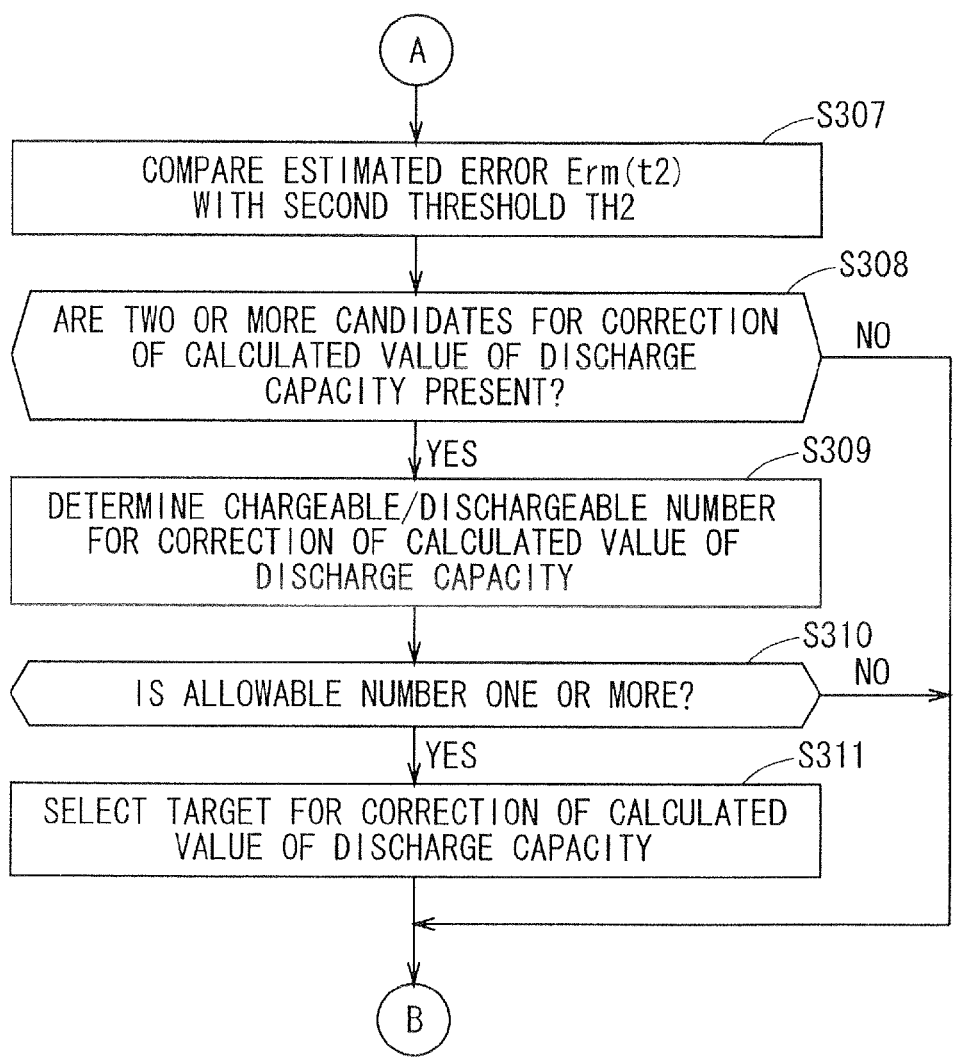
FIG. 12 is a flowchart illustrating a process for determining a target for the correction of the calculated value of the discharge capacity according to the third embodiment.

FIG. 11 and FIG. 12 are flowcharts illustrating a process to be repeated for determining the NaS batteries 2004 as the targets for the correction of the calculated values of the discharge capacities.

As shown in FIG. 11, in order to determine the NaS batteries 2004 as the targets for the correction of the calculated values of the discharge capacities, the estimated errors Erm (t2) of the plurality of NaS batteries 2004 are obtained from the estimated error calculator 2132 (step S301).

After the estimated errors Erm(t2) are obtained, the first comparator 3140 compares the estimated errors Erm(t2) with the first threshold TH1, and specifies the NaS batteries 2004 as the candidates for the correction of the calculated values of the discharge capacities (step S302).

As a result of comparison with the first threshold TH1, when the NaS batteries 2004 as the candidates for the correction of the calculated values of the discharge capacities are present ("YES" in step S303), the chargeable/dischargeable number determinator 3146 for correcting the calculated values of the discharge capacities determines the chargeable/dischargeable number for correcting the calculated values of the discharge capacities in a time zone to which current time belongs (step 304).

As a result, when the number of the NaS batteries 2004 where the correction of the calculated values of the discharge capacities are allowed is one or more ("YES" in step S305), the first selector 3144 selects the NaS batteries 2004 as the targets for the correction of the calculated values of the discharge capacities (step S306), and when 0 ("NO" in step S305), the NaS batteries 2004 as the targets for the correction of the calculated values of the discharge capacities are not selected and the process is ended.

As a result of selecting the NaS batteries 2004 as the targets for the correction of the calculated values of the discharge capacities, when the number of the NaS batteries 2004 selected as the targets for the correction of the calculated values of the discharge capacities reaches the number of the NaS batteries 2004 where the correction of the calculated values of the discharge capacities is allowed ("NO" in step S312), the charge/discharge for the correction of the calculated values of the discharge capacities cannot be newly started, and thus the process is ended.

On the other hand, as a result of the comparison with the first threshold TH1, when the NaS batteries 2004 as the targets for the correction of the calculated values of the discharge capacities are not present, subsequently as shown in FIG. 12, a comparison with the second threshold TH2 is made. When the number of the NaS batteries 2004 selected as the targets for the calculated values of the discharge capacities is smaller than the number of the NaS batteries 2004 where the correction of the calculated values of the discharge capacities is allowed ("YES" in step S312), subsequently as shown in FIG. 12, a comparison with the second threshold TH2 is made.

That is, the second comparator 3150 compares the estimated errors Erm(t2) with the second threshold TH2, and specifies the NaS batteries 2004 as the candidates for the correction of the calculated values of the discharge capacities (step S307).

As a result of the comparison with the second threshold TH2, when two or more NaS batteries 2004 are present as the candidates for the correction of the calculated values of the discharge capacities ("YES" in step S308), the chargeable/dischargeable number determinator 3146 determines the chargeable/dischargeable number in a time zone to which current time belongs (step S309).

As a result, when the number of the NaS batteries 2004 where the correction of the calculated values of the discharge capacities is allowed is one or more ("YES" in step S310), the second selector 3154 selects the NaS batteries 2004 as the targets for the correction of the calculated values of the discharge capacities (step S311), and when the number of the NaS batteries 2004 where the correction of the calculated values of the discharge capacities is allowed is 0, the NaS batteries 2004 as the targets for the correction of the calculated values of the discharge capacities are not selected and the process is ended.

In the correction target determinator 3134 according to the third embodiment, the NaS batteries 2004 where the estimated errors Erm(t2) are larger and the need for the correction of the calculated values of the discharge capacities is greater are sequentially subjected to the correction of the calculated values of the discharge capacities, and the correction of the calculated values of the discharge capacities is not simultaneously started in a large number of the NaS batteries 2004. For this reason, an influence on the output of the power storage device 2002 is suppressed.

(4. Fourth Embodiment)

A fourth embodiment relates to a current measuring part 4008 that is adopted instead of the Hall current detector 1008 according to the first embodiment.

Figure 13:
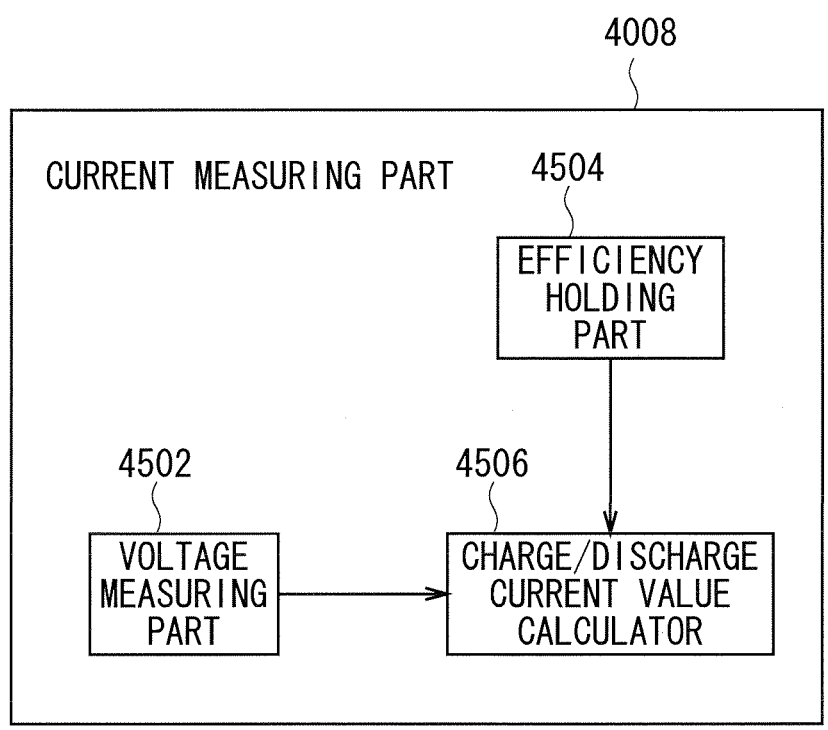
FIG. 13 is a block diagram illustrating a current measuring part according to a fourth embodiment.

FIG. 13 is a block diagram illustrating the current measuring part 4008 according to the fourth embodiment.

As shown in FIG. 13, the current measuring part 4008 has a voltage measuring part 4502 for measuring a voltage of the NaS battery 1004, an efficiency holding part 4504 for holding efficiency of the bidirectional converter 1112, and a charge/discharge current value calculator 4506 for calculating the charge/discharge current value I.

The charge/discharge current value calculator 4506 calculates the charge/discharge current value I of the NaS battery 1004 based on the target value of the charge/discharge electric power set by the charge/discharge command part 1136, the voltage measured by the voltage measuring part 4502 and the efficiency of the bidirectional converter 1112.

In the current measuring part 4008 according to the fourth embodiment, a low charge/discharge current can be measured. The Hall current detector 1008 according to the first embodiment may be combined with the current measuring part 4008 according to the fourth embodiment. For example, when the charge/discharge current is low, the current measuring part 4008 according to the fourth embodiment may measure the charge/discharge current value I, and when the charge/discharge current is high, the Hall current detector 1008 may measure the charge/discharge current value I. Further, instead of the Hall current detector 2008 according to the second embodiment, the current measuring part 4008 according to the fourth embodiment may be adopted.

(5. Fifth Embodiment)

A fifth embodiment relates to a current measuring part 5008 that is adopted instead of the Hall current detector 1008 according to the first embodiment.

FIG. 14 is a block diagram illustrating the current measuring part 5008 according to the fifth embodiment.

As shown in FIG. 14, the current measuring part 5008 has a voltage measuring part 5502 for measuring the voltage of the NaS battery 1004, an efficiency holding part 5504 for holding the efficiency of the bidirectional converter 1112, an electric power measuring part 5506 for measuring input/output power on an alternating current side of the bidirectional converter 1112, and a charge/discharge current value calculator 5508 for calculating the charge/discharge current value I.

The charge/discharge current value calculator 5508 calculates the charge/discharge current value based on the voltage measured by the voltage measuring part 5502, the input/output power measured by the electric power measuring part 5506 and the efficiency of the bidirectional converter 1112.

In the current measuring part 5008 according to the fifth embodiment, since an offset included in the measured charge/discharge current value with respect to a true charge/discharge current value is reduced, the charge/discharge current value is measured with high accuracy. This is because the current on the alternating current side of the bidirectional converter 1112 can be measured not only by the Hall current detector according to the first embodiment but also by a current detector having a winding-type current transformer capable of measuring a high current through a low current with high accuracy without an offset.

Instead of the current detector having the winding-type current transformer, a current detector having a shunt resistor can be adopted. The current detector having the winding type current transformer and the current detector having a Hall element are more advantageous than the current detector having the shunt resistor because they do not require parts resistant to a high voltage and a high current, and thus insulation is easy.

(6. Sixth Embodiment)

A sixth embodiment relates to a microgrid 6000 including the power storage device 1002 according to the first embodiment. In place of the power storage device 1002 according to the first embodiment, the power storage device 2002 according to the second embodiment may be adopted in the microgrid 6000.

Figure 15:
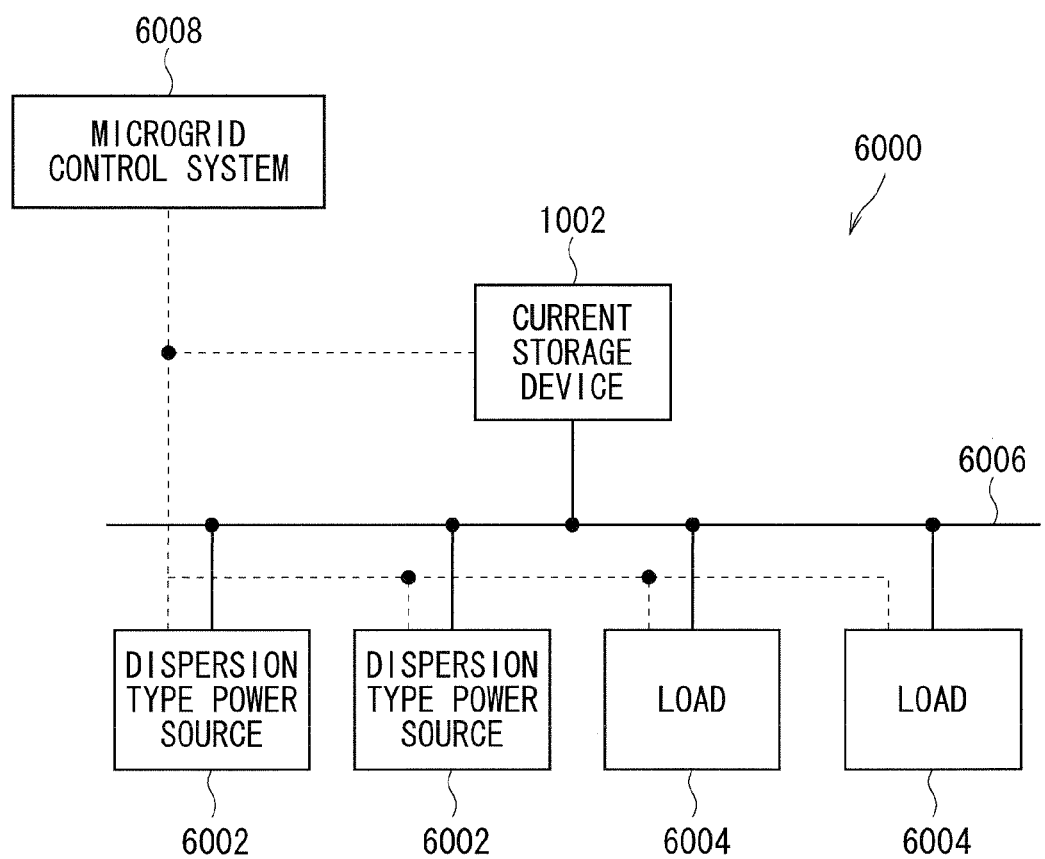
FIG. 15 is a block diagram illustrating a microgrid.

FIG. 15 is a block diagram illustrating the microgrid 6000 according to the sixth embodiment. "The microgrid" is a small-scale electricity supply network where a dispersion type power source is installed in an electric power demand area, and is called also as "a distributed energy system" or the like.

As shown in FIG. 15, in the microgrid 6000, a dispersion type power source 6002, a load 6004 and the power storage device 1002 in the first embodiment are connected to a system 6006. The operation of the dispersion type power source 6002, the load 6004 and the power storage device 1002 is controlled by a microgrid control system 6008.

As the dispersion type power source 6002, although not particularly limited, but power generators utilizing solar light and the other natural energy, such as photovoltaic power generating devices, are used. Fuel batteries or the like using gas manufactured by raw garbage, waste wood and waste plastic as raw materials may be used as the dispersion type power source 6002.

All or some of the electric powers generated by the dispersion type power source 6002 is transmitted to the power storage device 1002 via the system 6006, and are accumulated in the power storage device 1002.

When the calculated value of the discharge capacity in the NaS battery 1004 is corrected in the power storage device 1002 forming the microgrid 6000, a request for changing the output is sent from the power storage device 1002 to the microgrid control system 6008. Thereafter, the power storage device 1002 stops the electric power smooth operation or changes a load follow-up target value upon receiving the permission of the change in the target value of the charge/discharge electric power so as to charge/discharge the NaS battery 1004.

Since the electric power smooth operation with which SOC is basically maintained near the middle between a charge end and a discharge end is mostly performed in the microgrid 6000, the power storage device 1002 according to the first embodiment is preferably used. However, the power storage device 1002 according to the first embodiment is also used in the case of the pattern operation. When the power storage device 1002 performs the pattern operation according to an operation pattern set in advance, if the calculated value of the discharge capacity can be corrected by the charge/discharge according to the set operation pattern, the charge/discharge is performed according to the set operation pattern. In the charge/discharge according to the set operation pattern, when the depth of discharge at which the calculated value of the discharge capacity can be corrected is not obtained or when the charge/discharge is set at a plurality of times until the depth of discharge at which the calculated value of the discharge capacity can be corrected, the power storage device 1002 requests the microgrid control system 6008 to change the output, and after receiving the permission of the change in the output target value, changes the target value of the charge/discharge electric power.

When the power storage device 2002 according to the second embodiment is adopted instead of the power storage device 1002 according to the first embodiment, while the NaS batteries 2004 as the targets for the correction of the calculated values of the discharge capacities are being charged/discharged to the depth of discharge at which the correction is made, the charge/discharge of the other NaS batteries 2004 can be occasionally controlled so that the output of the power storage device 2002 matches with the charge/discharge electric power command value.

The present invention has been described in detail, but the above description is illustrative in all aspects, and the present invention is not limited to the above description. Various modified examples that are not illustrated can be assumed without deviating from the scope of the present invention. Particularly, it is naturally assumed to combine the matters described in the first to sixth embodiments.

The invention claimed is:

1. A battery control device for controlling a secondary battery, comprising:
   a current measuring part for measuring charge/discharge current value of the secondary battery;
   a discharge capacity calculator for computing an integral of the charge/discharge current value measured by said current measuring part so as to calculate a calculated value of a discharge capacity in the secondary battery, and correcting the calculated value of the discharge capacity in the secondary battery charged/discharged to a depth of discharge at which the calculated value of the discharge capacity is corrected;
   an estimated error calculator for calculating an estimated error of the calculated value of the discharge capacity calculated by said discharge capacity calculator;
   a first comparator for setting the secondary battery where the estimated error calculated by said estimated error calculator exceeds a first threshold as a candidate for correction of the calculated value of the discharge capacity,
   a first threshold holding part for holding the first threshold;
   a bidirectional converter for controlling charge/discharge of the secondary battery; and
   a charge/discharge command part for causing said bidirectional converter to charge/discharge all or some of the secondary battery as the candidate for the correction of the calculated value of the discharge capacity to the depth of discharge at which the correction is made.

2. The battery control device according to claim 1, wherein said estimated error calculator calculates the estimated error including a factor expressed by integration from a time of a previous correction of the calculated value of the discharge capacity to a current time.

3. The battery control device according to claim 1, wherein said estimated error calculator calculates the estimated error including a factor that becomes larger as a correcting amount in a previous correction of the calculated value of the discharge capacity is larger.

4. The battery control device according to claim 1, wherein said estimated error calculator calculates the estimated error including a factor that becomes larger as a change over time in the charge/discharge current value measured by said current measuring part is larger.

5. The battery control device according to claim 1, wherein said estimated error calculator calculates the estimated error including a factor that becomes larger as the charge/discharge current value measured by said current measuring part is larger.

6. The battery control device according to claim 1, wherein said discharge capacity calculator stops an integration of the charge/discharge current value while the charge/discharge current value measured by said current measuring part is smaller than a reference value, and
said estimated error calculator calculates the estimated error including a factor that becomes larger as the charge/discharge current value is larger when the charge/discharge current value measured by said current measuring part is smaller than the reference value.

7. The battery control device according to claim 1, wherein said estimated error calculator calculates the estimated error including a factor that becomes larger as an offset included in the charge/discharge current value measured by said current measuring part with respect to true charge/discharge current value is larger.

8. The battery control device according to claim 1, further comprising:
   a housing for housing said current measuring part; and
   a temperature sensor for measuring a temperature in said housing, wherein
   said estimated error calculator calculates the estimated error including a factor that becomes larger as the temperature measured by said temperature sensor is deviated from a reference temperature.

9. The battery control device according to claim 1, wherein said estimated error calculator calculates the estimated error including a factor that reflects an operating state of said bidirectional converter.

10. The battery control device according to claim 1, further comprising:
    a first selector for selecting the secondary battery to the allowed number in descending order of the estimated error calculated by said estimated error calculator as the target for the correction of the calculated value of the discharge capacity from the secondary battery that is set as the candidate for the correction of the calculated value of the discharge capacity by said first comparator, wherein
    said charge/discharge command part causes said bidirectional converter to charge/discharge the secondary battery selected by said first selector to the depth of discharge at which the correction is made.

11. The battery control device according to claim 1, further comprising:
    a second comparator for comparing the estimated error calculated by said estimated error calculator with a second threshold that does not exceed the first threshold and setting the secondary battery where the estimated error calculated by said estimated error calculator exceeds the second threshold as the candidate for the correction of the calculated value of the discharge capacity; and
    a second threshold holding part for holding the second threshold, wherein
    said charge/discharge command part causes said bidirectional converter to charge/discharge all or some of the secondary battery set as the candidate for the correction of the calculated value of the discharge capacity by said second comparator to the depth of discharge at which the correction is made.

12. The battery control device according to claim 11, further comprising:
a second selector for, when the number of the secondary battery set as the candidate for the correction of the calculated value of the discharge capacity by said second comparator is two or more, selecting the secondary battery to the allowed number in descending order of the estimated error calculated by said estimated error calculator as the target for the correction of the calculated value of the discharge capacity from the secondary battery set as the candidate for the correction of the calculated value of the discharge capacity by said second comparator, and when the number of the secondary battery set as the candidate for the correction of the calculated value of the discharge capacity by said second comparator is 1 or less, unselecting the target for the correction of the calculated value of the discharge capacity, wherein
said charge/discharge command part causes said bidirectional converter to charge/discharge the secondary battery selected by said second selector to the depth of discharge at which the correction is made.

13. The battery control device according to claim 1, further comprising:
a chargeable/dischargeable number determinator for determining the number of the secondary battery capable of being charged/discharged simultaneously for the correction of the calculated value of the discharge capacity in a time zone to which a current time belongs; and
a chargeable/dischargeable number holding part for holding the number of the secondary battery capable of being charged/discharged simultaneously for the correction of the calculated value of the discharge capacity in each time zone, wherein
said charge/discharge command part causes said bidirectional converter to charge/discharge secondary battery whose number does not exceed the number of the secondary battery determined by said chargeable/dischargeable number determinator to a depth of discharge at which the correction is made.

14. The battery control device according to claim 1, wherein said current measuring part includes a Hall current detector.

15. The battery control device according to claim 1, wherein
said charge/discharge command part sets a target value of charge/discharge electric power,
said bidirectional converter controls the charge/discharge of the secondary battery so that the charge/discharge electric power becomes the target value, and
said current measuring part includes:
a voltage measuring part for measuring voltage of the secondary battery,
a charge/discharge current value calculator for calculating the charge/discharge current value based on the target value of the charge/discharge electric power set by said charge/discharge command part, the voltage measured by said voltage measuring part and efficiency of said bidirectional converter; and
an efficiency holding part for holding the efficiency of said bidirectional converter.

16. The battery control device according to claim 1, wherein
said current measuring part includes:
a voltage measuring part for measuring voltage of the secondary battery,
an electric power measuring part for measuring input/output electric power on an alternating current side of said bidirectional converter,
a charge/discharge current value calculator for calculating the charge/discharge current value based on the voltage measured by said voltage measuring part, the input/output electric power measured by said electric power measuring part and efficiency of said bidirectional converter, and
an efficiency holding part for holding the efficiency of said bidirectional converter.

17. The battery control device according to claim 1, further comprising:
a display part for displaying the estimated error calculated by said estimated error calculator and a compared result of said first comparator; and
a manipulation part for accepting an input of a command for charging/discharging the secondary battery to the depth of discharge at which the calculated value of the discharge capacity is corrected, wherein
said charge/discharge command part causes said bidirectional converter to charge/discharge the secondary battery being the target for the correction of the calculated value of the discharge capacity which said manipulation part accepts the input of a command for charging/discharging to the depth of the discharge where the correction is made.

18. A method for controlling a secondary battery, comprising steps of:
a) measuring charge/discharge current value of the secondary battery;
b) computing an integral of the charge/discharge current value measured by said step a) and calculating calculated value of a discharge capacity in the secondary battery;
c) estimating an error of the calculated value of the discharge capacity calculated by said step b);
d) setting the secondary battery where the estimated error calculated by said step c) exceeds a threshold as a candidate for correction of the calculated value of the discharge capacity;
e) charging/discharging all or some of the secondary battery as the candidate for the correction of the discharge capacity to a depth of discharge at which the correction is made; and
f) correcting the calculated values of the discharge capacity in the secondary battery charged/discharged to the depth of discharge at which the calculated value of the discharge capacity is corrected.

* * * * *